United States Patent
Li

(10) Patent No.: US 9,980,305 B2
(45) Date of Patent: May 22, 2018

(54) METHOD AND DEVICE FOR TRIGGERING MULTIPLE UE COOPERATIVE COMMUNICATION

(71) Applicant: Huawei Technologies Co., Ltd., Shenzhen (CN)

(72) Inventor: Hantao Li, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 138 days.

(21) Appl. No.: 14/992,480

(22) Filed: Jan. 11, 2016

(65) Prior Publication Data

US 2016/0128123 A1    May 5, 2016

Related U.S. Application Data

(63) Continuation of application No. PCT/CN2013/079333, filed on Jul. 12, 2013.

(51) Int. Cl.
*H04W 88/04* (2009.01)
*H04W 76/02* (2009.01)
(Continued)

(52) U.S. Cl.
CPC .......... *H04W 76/023* (2013.01); *H04B 7/024* (2013.01); *H04B 7/026* (2013.01);
(Continued)

(58) Field of Classification Search
None
See application file for complete search history.

(56) References Cited

U.S. PATENT DOCUMENTS

| | | | | |
|---|---|---|---|---|
| 2011/0121949 A1* | 5/2011 | Guo | ............ | H04W 72/1257 340/10.2 |
| 2011/0275382 A1* | 11/2011 | Hakola | ............ | H04W 24/10 455/452.2 |

(Continued)

FOREIGN PATENT DOCUMENTS

| | | | |
|---|---|---|---|
| CN | 101399583 A | * | 4/2009 |
| CN | 101790204 A | | 7/2010 |

(Continued)

OTHER PUBLICATIONS

Nokia, Nokia Siemens Networks, 3GPP TSG-RAN WG1 Meeting #73, May 20-24, 2013, 3GPP, Fukuoka, Japan.*

(Continued)

*Primary Examiner* — Shukri A Taha
*Assistant Examiner* — The Hy Nguyen
(74) *Attorney, Agent, or Firm* — Slater Matsil, LLP

(57) ABSTRACT

In the present invention, a network device acquires terminal proximity relationship information and determines, according to the proximity relationship information, a beneficed terminal of multiple UE cooperative communication and at least one adjacent terminal of the beneficed terminal, the network device acquires channel quality information of the beneficed terminal and the at least one adjacent terminal of the beneficed terminal, makes, according to the channel quality information of the beneficed terminal and the at least one adjacent terminal of the beneficed terminal, a decision on whether to trigger the multiple UE cooperative communication for the beneficed terminal, and determines a supporting terminal of the multiple UE cooperative communication for the beneficed terminal according to the acquired channel quality information of the beneficed terminal and the at least one adjacent terminal of the beneficed terminal (Continued)

when it is decided that the multiple UE cooperative communication needs to be triggered.

18 Claims, 11 Drawing Sheets

(51) Int. Cl.
| | |
|---|---|
| *H04W 72/08* | (2009.01) |
| *H04B 7/026* | (2017.01) |
| *H04B 7/024* | (2017.01) |
| *H04W 24/08* | (2009.01) |
| *H04W 24/10* | (2009.01) |
| *H04B 7/155* | (2006.01) |

(52) U.S. Cl.
CPC .......... *H04W 24/08* (2013.01); *H04W 24/10* (2013.01); *H04W 72/08* (2013.01); *H04B 7/15592* (2013.01)

(56) References Cited

U.S. PATENT DOCUMENTS

| | | | |
|---|---|---|---|
| 2013/0064213 A1* | 3/2013 | Park | H04W 76/023 370/329 |
| 2013/0150061 A1 | 6/2013 | Shin et al. | |
| 2013/0331090 A1* | 12/2013 | Kim | H04W 76/023 455/422.1 |
| 2014/0185529 A1* | 7/2014 | Lim | H04W 76/023 370/328 |
| 2014/0329535 A1* | 11/2014 | Sadiq | H04W 76/023 455/452.2 |
| 2014/0370931 A1* | 12/2014 | Yang | H04B 7/022 455/524 |

FOREIGN PATENT DOCUMENTS

| | | | |
|---|---|---|---|
| CN | 102780993 A | | 11/2012 |
| CN | 102801505 A | | 11/2012 |
| CN | 103188706 A | * | 7/2013 |
| CN | 103188706 A | | 7/2013 |
| JP | 2013506377 A | | 2/2013 |

OTHER PUBLICATIONS

Nokia; "D2D Discovery," 3GPP TSG-RAN WG1 Meeting #73, R1-132317, May 20-24, 2013, 5 pages, Fukuoka, Japan.
Alcatel-Lucent; "General Considerations for D2D Discovery," 3GPP TSG-RAN1 Meeting #73, R1-132067, May 20-24, 2013, 4 pages, Fukuoka, Japan.
Czech Technical University in Prague, IAESI, "Aspects of the Decision Process for D2D Communication," 3GPP TSG-RAN WG1#73 R1-132322, Fukuoka, Japan, May 20-24, 2013, 3 pages.
Institute for Information Industry (III), "Evaluations of D2D Discovery Schemes," 3GPP TSG RAN WG1 Meeting #73 R1-132541, Fukuoka, Japan, May 20-24, 2013, 4 pages.

* cited by examiner

| | |
|---|---|
| PCI | Byte 1 |
| MUCC Capacity (MUCC capability information) / UU Energy level (Quality level of a UU interface link) | Byte 2 |
| D2D Code | Byte 3 |
| D2D Code | Byte 4 |
| D2D Code | Byte 5 |
| D2D Code | Byte 6 |
| D2D Code | Byte 7 |
| D2D Code | Byte 8 |

FIG. 6A

| |
|---|
| PCI (6 bits) |
| D2D Code (48 bits) |
| UU Energy level (Quality level of a UU interface link) (3 bits) |
| UD Energy level (Quality level of a UD interface link) (3 bits) |

FIG. 6B

METHOD AND DEVICE FOR TRIGGERING MULTIPLE UE COOPERATIVE COMMUNICATION

This application is a continuation of International Application No. PCT/CN2013/079333, filed on Jul. 12, 2013, which is hereby incorporated by reference in its entirety.

TECHNICAL FIELD

The present invention relates to the field of radio communications technologies, and in particular, to a method and device for triggering multiple UE cooperative communication.

BACKGROUND

With fast development of mobile communications technologies, mobile communications systems of a plurality of standards emerge, such as a GSM (Global System for Mobile Communications) network, a GPRS (general packet radio service) network, a WCDMA (Wideband Code Division Multiple Access) network, a CDMA-2000 network, a TD-SCDMA (Time Division-Synchronous Code Division Multiple Access) network, and a WiMAX (Worldwide Interoperability for Microwave Access) network. In addition to providing a voice communication service, these mobile communications systems generally further provide a data communication service. Therefore, a UE may use the data communication service provided by these mobile communications systems to upload and download various types of data.

In the prior art, CoMP (coordinated multipoint) is used to improve reliability of a terminal at an edge of a cell and CA (carrier aggregation) is used to increase throughput of a UE. However, if an environment of the terminal deteriorates, the throughput and/or reliability of data transmission of the terminal rapidly decline.

At present, a concept of MUCC (multiple UE cooperative communication) is put forward. In a multiple UE cooperative communication technology, a D2D (device to device) communication technology implements communication between terminals, thereby making it possible to have same support between the terminals. Therefore, data that a base station sends to a terminal can be sent to another terminal (namely, a supporting terminal, which is expressed as an S-UE) adjacent to the terminal and then forwarded to a final destination terminal (namely, a beneficed terminal, which is expressed as a B-UE) by using a near field communication technology between the terminals. In this way, a terminal with a good channel condition can be selected as an S-UE from a plurality of terminals, which increases an edge rate of a UE by using a multiple UE diversity gain, thereby improving spectrum utilization.

In the D2D technology, a proximity discovery technology and the near field communication technology are a basis of multiple UE cooperative communication. In the proximity discovery technology, after a device that needs to enable a proximity discovery function initiates a request for enabling the proximity discovery function to a near field service server, the near field service server allocates broadcast information dedicated to proximity discovery to the device that initiates the request. The broadcast information is a near field identifier or a D2D code (D2D Code), which is a unique identifier of a device for implementing global proximity discovery. On one hand, the device that acquires the D2D code announces its existence in a current position by using a predefined rule to externally broadcast a signal carrying the D2D Code, so as to help other devices to discover the device that acquires the D2D Code. On the other hand, the device that acquires the D2D Code uses the predefined rule to monitor a signal that is broadcast by the other devices and carries the D2D Code. When the device receives the signal that is broadcast by the other devices and carries the D2D Code or after the device receives the signal that is broadcast by the other devices and carries the D2D Code and successfully attempts physical layer interaction with the other devices, it indicates that the other devices are within a near field range.

The prior multiple UE cooperative communication technology provides neither a cooperative communication trigger mechanism nor a scheme for accurately finding a cooperative communication UE of a terminal.

SUMMARY

Embodiments provide a method and device for triggering multiple UE cooperative communication, so as to implement a decision on whether to trigger the multiple UE cooperative communication based on a UE proximity relationship.

A first aspect provides a method for implementing multiple UE cooperative communication. The method includes acquiring, by a network device, terminal proximity relationship information and determining, according to the proximity relationship information, a beneficed terminal of the multiple UE cooperative communication and at least one adjacent terminal of the beneficed terminal, where the proximity relationship information includes at least a device to device D2D code of the at least one adjacent terminal. The method also includes acquiring, by the network device, channel quality information of the beneficed terminal and the at least one adjacent terminal of the beneficed terminal. The method also includes making, by the network device according to the channel quality information of the beneficed terminal and the at least one adjacent terminal of the beneficed terminal, a decision on whether to trigger the multiple UE cooperative communication for the beneficed terminal, and determining a supporting terminal of the multiple UE cooperative communication for the beneficed terminal according to the acquired channel quality information of the beneficed terminal and the at least one adjacent terminal of the beneficed terminal when it is decided that the multiple UE cooperative communication needs to be triggered.

With reference to the first aspect, in a first possible implementation manner, the making, by the network device according to the channel quality information of the beneficed terminal and the at least one adjacent terminal of the beneficed terminal, a decision on whether to trigger the multiple UE cooperative communication for the beneficed terminal includes deciding, by the network device, to trigger the multiple UE cooperative communication for the beneficed terminal if it is determined, according to the channel quality information of the beneficed terminal and the at least one adjacent terminal of the beneficed terminal, that the at least one adjacent terminal of the beneficed terminal includes a terminal meeting a first condition, where the first condition includes that channel quality of a first link of the at least one adjacent terminal is not lower than channel quality of a first link of the beneficed terminal. The first link of the beneficed terminal is a link between the beneficed terminal and the network device, and the first link of the at least one adjacent terminal of the beneficed terminal is a link between the at least one adjacent terminal of the beneficed terminal and the network device.

With reference to the first aspect, in a second possible implementation manner, the channel quality information acquired by the network device includes channel quality information of a first link of the beneficed terminal and channel quality information of a first link of the at least one adjacent terminal of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device. The determining a supporting terminal of the multiple UE cooperative communication for the beneficed terminal according to the acquired channel quality information of the beneficed terminal and the at least one adjacent terminal of the beneficed terminal includes selecting, by the network device according to the channel quality information of the first link of the beneficed terminal and the channel quality information of the first link of the at least one adjacent terminal of the beneficed terminal, a terminal that has channel quality of the first link not lower than channel quality of the first link of the beneficed terminal from the at least one adjacent terminal of the beneficed terminal, and determining the selected terminal as the supporting terminal of the multiple UE cooperative communication for the beneficed terminal.

With reference to the second possible implementation manner of the first aspect, in a third possible implementation manner, the method further includes acquiring, by the network device, multiple UE cooperative communication capability information of the at least one adjacent terminal of the beneficed terminal. The determining a supporting terminal of the multiple UE cooperative communication for the beneficed terminal according to the acquired channel quality information of the beneficed terminal and the at least one adjacent terminal of the beneficed terminal includes selecting, by the network device according to the multiple UE cooperative communication capability information of the at least one adjacent terminal of the beneficed terminal, a terminal that is capable of supporting the multiple UE cooperative communication and has the channel quality of the first link not lower than the channel quality of the first link of the beneficed terminal from the at least one adjacent terminal of the beneficed terminal, and determining the selected terminal as the supporting terminal of the multiple UE cooperative communication for the beneficed terminal.

With reference to the first aspect, in a fourth possible implementation manner, the channel quality information acquired by the network device includes channel quality information of a first link of the beneficed terminal and channel quality information of first and second links of the at least one adjacent terminal of the beneficed terminal, where the first link of the beneficed terminal is a link between the beneficed terminal and the network device, the first link of the at least one adjacent terminal of the beneficed terminal is a link between the at least one adjacent terminal of the beneficed terminal and the network device, and the second link is a link between the at least one adjacent terminal of the beneficed terminal and the beneficed terminal. The determining a supporting terminal of the multiple UE cooperative communication for the beneficed terminal according to the acquired channel quality information of the beneficed terminal and the at least one adjacent terminal of the beneficed terminal includes selecting, by the network device according to the channel quality information of the first link of the beneficed terminal and the channel quality information of the first link of the at least one adjacent terminal of the beneficed terminal, terminal that have channel quality of the first link not lower than channel quality of the first link of the beneficed terminal from the at least one adjacent terminal of the beneficed terminal to constitute a candidate supporting terminal set, selecting, according to the channel quality information of all the second link, a set quantity of candidate supporting terminals from the candidate supporting terminal set based on channel quality of all the second link in descending order, and determining the selected candidate supporting terminals as the supporting terminals of the multiple UE cooperative communication for the beneficed terminal; or selecting, by the network device according to the channel quality information of the first link of the beneficed terminal and the channel quality information of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, selecting a candidate supporting terminal that has channel quality of the second link not lower than the channel quality of the first link of the beneficed terminal from the candidate supporting terminal set according to the channel quality information of the second link, and determining the selected candidate supporting terminal as the supporting terminal of the multiple UE cooperative communication for the beneficed terminal.

With reference to the fourth possible implementation manner of the first aspect, in a fifth possible implementation manner, after the selecting a terminal that has channel quality of the second link not lower than the channel quality of the first link of the beneficed terminal from the candidate supporting terminal set, the method further includes determining, by the network device according to the channel quality information, which is reported by the selected candidate supporting terminal, of the first link, whether an expected gain exceeds a set threshold, and determining the selected candidate supporting terminal as the supporting terminal of the multiple UE cooperative communication for the beneficed terminal if the expected gain exceeds the set threshold.

With reference to the fourth possible implementation manner of the first aspect, in a sixth possible implementation manner, the method further includes: acquiring, by the network device, multiple UE cooperative communication capability information of the at least one adjacent terminal of the beneficed terminal. The method further includes the determining a supporting terminal of the multiple UE cooperative communication for the beneficed terminal according to the acquired channel quality information of the beneficed terminal and the at least one adjacent terminal of the beneficed terminal includes selecting, by the network device according to the multiple UE cooperative communication capability information of the at least one adjacent terminal of the beneficed terminal, terminals that are capable of supporting the multiple UE cooperative communication and have the channel quality of the first link not lower than the channel quality of the first link of the beneficed terminal from the at least one adjacent terminal of the beneficed terminal to constitute a candidate supporting terminal set, selecting a set quantity of candidate supporting terminals from the candidate supporting terminal set based on the channel quality of the second link in descending order, and determining the selected candidate supporting terminals as the supporting terminals of the multiple UE cooperative communication for the beneficed terminal.

With reference to the third or sixth possible implementation manner of the first aspect, in a seventh possible implementation manner, the acquiring, by the network device, multiple UE cooperative communication capability information of the at least one adjacent terminal of the beneficed terminal includes receiving, by the network device, the proximity relationship information reported by a terminal and acquiring the multiple UE cooperative communication capability information of the at least one adjacent terminal of the beneficed terminal from the received proximity relationship information.

With reference to the fourth possible implementation manner of the first aspect, in an eighth possible implementation manner, the network device acquires the channel quality information of the second link of the at least one adjacent terminal of the beneficed terminal in the following manner: receiving, by the network device, the proximity relationship information reported by a terminal and acquiring the channel quality information of the second link of the at least one adjacent terminal of the beneficed terminal from the received proximity relationship information.

With reference to the second or fourth possible implementation manner of the first aspect, in a ninth possible implementation manner, the network device acquires the channel quality information of the first link of the beneficed terminal and the channel quality information of the first link of the at least one adjacent terminal of the beneficed terminal in the following manner: acquiring, by the network device for a terminal that is in an active state in the at least one adjacent terminal of the beneficed terminal, a measurement report reported by the terminal that is in the active state and acquiring, according to the measurement report reported by the terminal that is in the active state, the channel quality information of the first link; and paging, by the network device for a terminal that is in an idle state in the at least one adjacent terminal of the beneficed terminal, the terminal that is in the idle state, acquiring a measurement report reported after the terminal that is in the idle state enters the active state, and acquiring, according to the measurement report reported after the terminal that is in the idle state enters the active state, the channel quality information of the first link; or acquiring, by the network device according to received information of the at least one adjacent terminal, the channel quality information of the first link of the at least one adjacent terminal of the beneficed terminal, where the information of the at least one adjacent terminal includes the channel quality information of the first link of the at least one adjacent terminal.

With reference to the first aspect, in a tenth possible implementation manner, the acquiring, by a network device, terminal proximity relationship information and determining, according to the acquired proximity relationship information, a beneficed terminal of the multiple UE cooperative communication and at least one adjacent terminal of the beneficed terminal includes: receiving, by the network device, information of the at least one adjacent terminal that is measured by means of proximity discovery and reported by the beneficed terminal of the multiple UE cooperative communication and/or the supporting terminal of the multiple UE cooperative communication, and determining, according to the received information of the at least one adjacent terminal, the beneficed terminal of the multiple UE cooperative communication and the at least one adjacent terminal of the beneficed terminal; or detecting, by the network device, position information of the beneficed terminal and supporting terminal of the multiple UE cooperative communication and determining, according to the detected terminal position information, the beneficed terminal of the multiple UE cooperative communication and the at least one adjacent terminal of the beneficed terminal.

With reference to the first aspect and any one of the first to tenth possible implementation manners of the first aspect, in an eleventh possible implementation manner, the method further includes: receiving, by the network device, a multiple UE cooperative communication trigger request reported by the beneficed terminal and/or the at least one adjacent terminal of the beneficed terminal, where the multiple UE cooperative communication trigger request carries information of the beneficed terminal; and discarding the multiple UE cooperative communication trigger request if the network device decides that the multiple UE cooperative communication does not need to be triggered for the beneficed terminal corresponding to the information, which is carried in the multiple UE cooperative communication trigger request, of the beneficed terminal.

With reference to the eleventh possible implementation manner of the first aspect, in a twelfth possible implementation manner, the multiple UE cooperative communication trigger request further carries the candidate supporting terminal set of the beneficed terminal corresponding to the information of the beneficed terminal. After the determining, by the network device, a supporting terminal of the multiple UE cooperative communication for the beneficed terminal according to the acquired channel quality information of the beneficed terminal and the at least one adjacent terminal of the beneficed terminal, the method further includes: acquiring, by the network device, an intersection of the supporting terminal of the multiple UE cooperative communication, which is determined for the beneficed terminal according to the acquired channel quality information of the beneficed terminal and the at least one adjacent terminal of the beneficed terminal, and the candidate supporting terminal set carried in the multiple UE cooperative communication trigger request, and using a terminal acquired by acquiring the intersection as the supporting terminal of the multiple UE cooperative communication for the beneficed terminal.

A second aspect provides a method for implementing multiple UE cooperative communication, including performing, by a terminal, measurement to acquire at least one adjacent terminal of the terminal. The method also includes reporting, by the terminal, measured terminal proximity relationship information to a network device, where the terminal proximity relationship information includes at least a device to device D2D code of the at least one adjacent terminal and information of the at least one adjacent terminal is used for the network device to determine a beneficed terminal of the multiple UE cooperative communication and at least one adjacent terminal of the beneficed terminal and make a decision on whether to trigger the multiple UE cooperative communication for the beneficed terminal.

With reference to the second aspect, in a first possible implementation manner, the terminal proximity relationship information that the terminal reports to the network device further includes one piece of or a combination of the following information: channel quality information of a first link of the at least one adjacent terminal, where the first link is a link between the at least one adjacent terminal and the network device; channel quality information of a second link of the at least one adjacent terminal, where the second link is a link between the at least one adjacent terminal and the terminal reporting the information of the at least one adjacent terminal; and multiple UE cooperative communication capability information of the at least one adjacent terminal.

With reference to the second aspect, in a second possible implementation manner, the reporting, by the terminal, measured terminal proximity relationship information to a network device includes selecting, by the terminal, a to-be-reported adjacent terminal from the measured terminal proximity relationship information and reporting information of the selected adjacent terminal to the network device. The selecting a to-be-reported adjacent terminal includes: filtering, by the terminal according to a multiple UE cooperative communication capability of the at least one adjacent terminal of the terminal, the at least one adjacent terminal acquired by the measurement performed by the terminal; or selecting, by the terminal according to channel quality of a first link of the terminal and channel quality of a first link of the at least one adjacent terminal of the terminal, a terminal that has the channel quality of the first link not lower than the channel quality of the first link of the terminal from the at least one adjacent terminal, where the first link is a link between the terminal and the network device; or selecting, by the terminal according to channel quality of a second link of the terminal and channel quality of a second link of the at least one adjacent terminal of the terminal, a set quantity of terminals from the at least one adjacent terminal of the terminal based on the channel quality of the second link in descending order; or selecting a terminal that has channel quality of a second link not lower than a set threshold from the at least one adjacent terminal; or calculating, by the terminal according to channel quality of first and second links of the at least one adjacent terminal of the terminal, a value of a weighted sum of the channel quality of the first link and the channel quality of the second link, and selecting a set quantity of terminals from the at least one adjacent terminal based on channel quality, which is acquired after weighted summation, in descending order.

With reference to the second aspect or the first possible implementation manner of the second aspect, in a third possible implementation manner, if the terminal is the beneficed terminal of the multiple UE cooperative communication, the method further includes: sending a multiple UE cooperative communication trigger request to the network device when a current service rate of the beneficed terminal of the multiple UE cooperative communication is less than an expected service rate; or if the terminal is a supporting terminal of the multiple UE cooperative communication, the method further includes sending a multiple UE cooperative communication trigger request to the network device when the supporting terminal of the multiple UE cooperative communication determines that a gain of a second link with the beneficed terminal of UE cooperative communication reaches an expected gain threshold.

With reference to the third possible implementation manner of the second aspect, in a fourth possible implementation manner, before the sending a multiple UE cooperative communication trigger request to the network device, the method further includes determining a candidate supporting terminal set of the beneficed terminal of the multiple UE cooperative communication, where the multiple UE cooperative communication trigger request includes the candidate supporting terminal set of the beneficed terminal of the multiple UE cooperative communication.

A third aspect provides a network device, including: an acquiring module, configured to acquire terminal proximity relationship information; and a determining module, configured to determine, according to the proximity relationship information acquired by the acquiring module, a beneficed terminal of multiple UE cooperative communication and at least one adjacent terminal of the beneficed terminal, where the proximity relationship information includes at least a device to device D2D code of the at least one adjacent terminal. Also included is the acquiring module, configured to acquire, according to the beneficed terminal and the at least one adjacent terminal of the beneficed terminal that are determined by the determining module, channel quality information of the beneficed terminal and the at least one adjacent terminal of the beneficed terminal. Also included is a deciding module, configured to make, according to the channel quality information, which is acquired by the acquiring module, of the beneficed terminal and the at least one adjacent terminal of the beneficed terminal, a decision on whether to trigger the multiple UE cooperative communication for the beneficed terminal; and a selecting module, configured to determine a supporting terminal of the multiple UE cooperative communication for the beneficed terminal according to the channel quality information, which is acquired by the acquiring module, of the beneficed terminal and the at least one adjacent terminal of the beneficed terminal when the deciding module decides that the multiple UE cooperative communication needs to be triggered.

With reference to the third aspect, in a first possible implementation manner, the deciding module is specifically configured to decide to trigger the multiple UE cooperative communication for the beneficed terminal if it is determined, according to the channel quality information, which is acquired by the acquiring module, of the beneficed terminal and the at least one adjacent terminal of the beneficed terminal, that the at least one adjacent terminal of the beneficed terminal includes a terminal meeting a first condition, where the first condition includes that channel quality of a first link of the at least one adjacent terminal is not lower than channel quality of a first link of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device.

With reference to the third aspect, in a second possible implementation manner, the channel quality information acquired by the acquiring module includes: channel quality information of a first link of the beneficed terminal and channel quality information of a first link of the at least one adjacent terminal of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device; and the selecting module is specifically configured to select, according to the channel quality information, which is acquired by the acquiring module, of the first link of the beneficed terminal and the channel quality information, which is acquired by the acquiring module, of the first link of the at least one adjacent terminal of the beneficed terminal, a terminal that has channel quality of the first link not lower than channel quality of the first link of the beneficed terminal from the at least one adjacent terminal of the beneficed terminal, and determine the selected terminal as the supporting terminal of the multiple UE cooperative communication for the beneficed terminal.

With reference to the second possible implementation manner of the third aspect, in a third possible implementation manner, the acquiring module is further configured to acquire multiple UE cooperative communication capability information of the at least one adjacent terminal of the beneficed terminal; and the selecting module is specifically configured to select, according to the multiple UE cooperative communication capability information, which is acquired by the acquiring module, of the at least one adjacent terminal of the beneficed terminal, a terminal that is capable of supporting the multiple UE cooperative communication and has the channel quality of the first link not lower than the channel quality of the first link of the beneficed terminal from the at least one adjacent terminal of the beneficed terminal, and determine the selected terminal as the supporting terminal of the multiple UE cooperative communication for the beneficed terminal.

With reference to the third aspect, in a fourth possible implementation manner, the channel quality information acquired by the acquiring module includes channel quality information of a first link of the beneficed terminal and channel quality information of first and second links of the at least one adjacent terminal of the beneficed terminal, where the first link of the beneficed terminal is a link between the beneficed terminal and the network device, the first link of the at least one adjacent terminal of the beneficed terminal is a link between the at least one adjacent terminal of the beneficed terminal and the network device, and the second link is a link between the at least one adjacent terminal of the beneficed terminal and the beneficed terminal; and the selecting module is specifically configured to select, according to the channel quality information, which is acquired by the acquiring module, of the first link of the beneficed terminal and the channel quality information, which is acquired by the acquiring module, of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information, which is acquired by the acquiring module, of all the second link, a set quantity of candidate supporting terminals from the candidate supporting terminal set based on channel quality of all the second link in descending order, and determine the selected candidate supporting terminals as the supporting terminals of the multiple UE cooperative communication for the beneficed terminal; or select, according to the channel quality information, which is acquired by the acquiring module, of the first link of the beneficed terminal and the channel quality information, which is acquired by the acquiring module, of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information, which is acquired by the acquiring module, of the second link, a candidate supporting terminal that has channel quality of the second link not lower than the channel quality of the first link of the beneficed terminal from the candidate supporting terminal set, and determine the selected candidate supporting terminal as the supporting terminal of the multiple UE cooperative communication for the beneficed terminal.

With reference to the fourth possible implementation manner of the third aspect, in a fifth possible implementation manner, the selecting module is further configured to determine, according to the channel quality information, which is reported by the selected candidate supporting terminal, of the first link after the terminal that has the channel quality of the second link not lower than the channel quality of the first link of the beneficed terminal is selected from the candidate supporting terminal set, whether an expected gain exceeds a set threshold, and determine the selected candidate supporting terminal as the supporting terminal of the multiple UE cooperative communication for the beneficed terminal if the expected gain exceeds the set threshold.

With reference to the fourth possible implementation manner of the third aspect, in a sixth possible implementation manner, the acquiring module is further configured to acquire multiple UE cooperative communication capability information of the at least one adjacent terminal of the beneficed terminal; and the selecting module is specifically configured to select, according to the multiple UE cooperative communication capability information, which is acquired by the acquiring module, of the at least one adjacent terminal of the beneficed terminal, terminals that are capable of supporting the multiple UE cooperative communication and have the channel quality of the first link not lower than the channel quality of the first link of the beneficed terminal from the at least one adjacent terminal of the beneficed terminal to constitute a candidate supporting terminal set, select a set quantity of candidate supporting terminals from the candidate supporting terminal set based on the channel quality of the second link in descending order, and determine the selected candidate supporting terminals as the supporting terminals of the multiple UE cooperative communication for the beneficed terminal.

With reference to the third or sixth possible implementation manner of the third aspect, in a seventh possible implementation manner, the acquiring module is specifically configured to receive the proximity relationship information reported by a terminal and acquire the multiple UE cooperative communication capability information of the at least one adjacent terminal of the beneficed terminal from the received proximity relationship information.

With reference to the fourth possible implementation manner of the third aspect, in an eighth possible implementation manner, the acquiring module acquires the channel quality information of the second link of the at least one adjacent terminal of the beneficed terminal in the following manner: receiving the proximity relationship information reported by a terminal and acquiring the channel quality information of the second link of the at least one adjacent terminal of the beneficed terminal from the received proximity relationship information.

With reference to the second or fourth possible implementation manner of the third aspect, in a ninth possible implementation manner, the acquiring module acquires the channel quality information of the first link of the beneficed terminal and the channel quality information of the first link of the at least one adjacent terminal of the beneficed terminal in the following manner: acquiring, for a terminal that is in an active state in the at least one adjacent terminal of the beneficed terminal, a measurement report reported by the terminal that is in the active state and acquiring, according to the measurement report reported by the terminal that is in the active state, the channel quality information of the first link; and paging, for a terminal that is in an idle state in the at least one adjacent terminal of the beneficed terminal, the terminal that is in the idle state, acquiring a measurement report reported after the terminal that is in the idle state enters the active state, and acquiring, according to the measurement report reported after the terminal that is in the idle state enters the active state, the channel quality information of the first link; or acquiring, according to received information of the at least one adjacent terminal, the channel quality information of the first link of the at least one adjacent terminal of the beneficed terminal, where the information of the at least one adjacent terminal includes the channel quality information of the first link of the at least one adjacent terminal.

With reference to the third aspect, in a tenth possible implementation manner, the acquiring module is specifically configured to receive information of the at least one adjacent terminal that is measured by means of proximity discovery and reported by the beneficed terminal of the multiple UE cooperative communication and/or the supporting terminal of the multiple UE cooperative communication, and the determining module is specifically configured to determine, according to the information, which is received by the acquiring module, of the at least one adjacent terminal, the beneficed terminal of the multiple UE cooperative communication and the at least one adjacent terminal of the beneficed terminal; or the acquiring module is specifically configured to detect, position information of the beneficed terminal and supporting terminal of the multiple UE cooperative communication, and the determining module is specifically configured to determine, according to the terminal position information detected by the acquiring module, the beneficed terminal of the multiple UE cooperative communication and the at least one adjacent terminal of the beneficed terminal.

With reference to the third aspect and any one of the first to tenth possible implementation manners of the third aspect, in an eleventh possible implementation manner, the network device further includes a request receiving module, where: the request receiving module is configured to: receive a multiple UE cooperative communication trigger request reported by the beneficed terminal and/or the at least one adjacent terminal of the beneficed terminal, where the multiple UE cooperative communication trigger request carries information of the beneficed terminal; and discard the multiple UE cooperative communication trigger request when the deciding module decides that the multiple UE cooperative communication does not need to be triggered for the beneficed terminal corresponding to the information, which is carried in the multiple UE cooperative communication trigger request, of the beneficed terminal.

With reference to the eleventh possible implementation manner of the third aspect, in a twelfth possible implementation manner, the multiple UE cooperative communication trigger request further carries the candidate supporting terminal set of the beneficed terminal corresponding to the information of the beneficed terminal; and the selecting module is specifically configured to: after the supporting terminal of the multiple UE cooperative communication is determined for the beneficed terminal according to the channel quality information, which is acquired by the acquiring module, of the beneficed terminal and the at least one adjacent terminal of the beneficed terminal, acquire an intersection of the supporting terminal of the multiple UE cooperative communication, which is determined for the beneficed terminal according to the channel quality information, which is acquired by the acquiring module, of the beneficed terminal and the at least one adjacent terminal of the beneficed terminal, and the candidate supporting terminal set carried in the multiple UE cooperative communication trigger request, and use a terminal acquired by acquiring the intersection as the supporting terminal of the multiple UE cooperative communication for the beneficed terminal.

A fourth aspect provides a terminal device, including a measuring module, configured to perform measurement to acquire at least one adjacent terminal of the terminal; and a reporting module, configured to report terminal proximity relationship information measured by the measuring module to a network device, where the terminal proximity relationship information includes at least a device to device D2D code of the at least one adjacent terminal and information of the at least one adjacent terminal is used for the network device to determine a beneficed terminal of multiple UE cooperative communication and at least one adjacent terminal of the beneficed terminal and make a decision on whether to trigger the multiple UE cooperative communication for the beneficed terminal.

With reference to the fourth aspect, in a first possible implementation manner, the terminal proximity relationship information that the reporting module reports to the network device further includes one piece of or a combination of the following information: channel quality information of a first link of the at least one adjacent terminal, where the first link is a link between the at least one adjacent terminal and the network device; channel quality information of a second link of the at least one adjacent terminal, where the second link is a link between the at least one adjacent terminal and the terminal reporting the information of the at least one adjacent terminal; and multiple UE cooperative communication capability information of the at least one adjacent terminal.

With reference to the fourth aspect, in a second possible implementation manner, the terminal device further includes a selecting module, where: the selecting module is configured to select a to-be-reported adjacent terminal from the terminal proximity relationship information measured by the measuring module; and the reporting module is specifically configured to report information of the adjacent terminal selected by the selecting module to the network device. The selecting module is specifically configured to filter, according to a multiple UE cooperative communication capability of the at least one adjacent terminal of the terminal, the at least one adjacent terminal acquired by the measurement performed by the terminal; or select, according to channel quality of a first link of the terminal and channel quality of a first link of the at least one adjacent terminal of the terminal, a terminal that has the channel quality of the first link not lower than the channel quality of the first link of the terminal from the at least one adjacent terminal, where the first link is a link between the terminal and the network device; or select, according to channel quality of a second link of the terminal and channel quality of a second link of the at least one adjacent terminal of the terminal, a set quantity of terminals from the at least one adjacent terminal of the terminal based on the channel quality of the second link in descending order; or select a terminal that has channel quality of a second link not lower than a set threshold from the at least one adjacent terminal; or calculate, according to channel quality of first and second links of the at least one adjacent terminal of the terminal, a value of a weighted sum of the channel quality of the first link and the channel quality of the second link, and select a set quantity of terminals from the at least one adjacent terminal based on channel quality, which is acquired after weighted summation, in descending order.

With reference to the first or second possible implementation manner of the fourth aspect, in a third possible implementation manner, the terminal device further includes a requesting module, where the requesting module is configured to: send a multiple UE cooperative communication trigger request to the network device when the terminal is the beneficed terminal of the multiple UE cooperative communication and a current service rate of the terminal is less than an expected service rate; or send a multiple UE cooperative communication trigger request to the network device when the terminal is a supporting terminal of the multiple UE cooperative communication and the terminal determines that a gain of a second link with the beneficed terminal of UE cooperative communication reaches an expected gain threshold.

With reference to the third possible implementation manner of the fourth aspect, in a fourth possible implementation manner, the terminal device further includes a determining module, where the determining module is configured to determine, a candidate supporting terminal set of the beneficed terminal of the multiple UE cooperative communication before the requesting module sends the multiple UE cooperative communication trigger request to the network device; and the requesting module is specifically configured to carry the candidate supporting terminal set, which is determined by the determining module, of the beneficed terminal of the multiple UE cooperative communication in the multiple UE cooperative communication trigger request for sending.

A fifth aspect provides a network device, including a processor, an interface module, and a memory, where the processor is configured to: acquire terminal proximity relationship information through the interface module, store the terminal proximity relationship information in the memory, and determine, according to the proximity relationship information, a beneficed terminal of multiple UE cooperative communication and at least one adjacent terminal of the beneficed terminal, where the proximity relationship information includes at least a device to device D2D code of the at least one adjacent terminal; acquire, according to the determined beneficed terminal and the at least one adjacent terminal of the beneficed terminal, channel quality information of the beneficed terminal and the at least one adjacent terminal of the beneficed terminal and store the channel quality information in the memory; and make, according to the acquired channel quality information of the beneficed terminal and the at least one adjacent terminal of the beneficed terminal, a decision on whether to trigger the multiple UE cooperative communication for the beneficed terminal and determine a supporting terminal of the multiple UE cooperative communication for the beneficed terminal according to the channel quality information of the beneficed terminal and the at least one adjacent terminal of the beneficed terminal when it is decided that the multiple UE cooperative communication needs to be triggered.

With reference to the fifth aspect, in a first possible implementation manner, the processor is specifically configured to decide to trigger the multiple UE cooperative communication for the beneficed terminal if it is determined, according to the channel quality information of the beneficed terminal and the at least one adjacent terminal of the beneficed terminal, that the at least one adjacent terminal of the beneficed terminal includes a terminal meeting a first condition, where the first condition includes that channel quality of a first link of the at least one adjacent terminal is not lower than channel quality of a first link of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device.

With reference to the fifth aspect, in a second possible implementation manner, the channel quality information includes: channel quality information of a first link of the beneficed terminal and channel quality information of a first link of the at least one adjacent terminal of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device. The processor is specifically configured to select, according to the channel quality information of the first link of the beneficed terminal and the channel quality information of the first link of the at least one adjacent terminal of the beneficed terminal, a terminal that has channel quality of the first link not lower than channel quality of the first link of the beneficed terminal from the at least one adjacent terminal of the beneficed terminal, and determine the selected terminal as the supporting terminal of the multiple UE cooperative communication for the beneficed terminal.

With reference to the second possible implementation manner of the fifth aspect, in a third possible implementation manner, the processor is further configured to acquire multiple UE cooperative communication capability information of the at least one adjacent terminal of the beneficed terminal through the interface module. The processor is specifically configured to select, according to the multiple UE cooperative communication capability information of the at least one adjacent terminal of the beneficed terminal, a terminal that is capable of supporting the multiple UE cooperative communication and has the channel quality of the first link not lower than the channel quality of the first link of the beneficed terminal from the at least one adjacent terminal of the beneficed terminal, and determine the selected terminal as the supporting terminal of the multiple UE cooperative communication for the beneficed terminal.

With reference to the fifth aspect, in a fourth possible implementation manner, the channel quality information includes: channel quality information of a first link of the beneficed terminal and channel quality information of first and second links of the at least one adjacent terminal of the beneficed terminal, where the first link of the beneficed terminal is a link between the beneficed terminal and the network device, the first link of the at least one adjacent terminal of the beneficed terminal is a link between the at least one adjacent terminal of the beneficed terminal and the network device, and the second link is a link between the at least one adjacent terminal of the beneficed terminal and the beneficed terminal. The processor is specifically configured to select, according to the channel quality information of the first link of the beneficed terminal and the channel quality information of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information of all the second link, a set quantity of candidate supporting terminals from the candidate supporting terminal set based on channel quality of all the second link in descending order, and determine the selected candidate supporting terminals as the supporting terminals of the multiple UE cooperative communication for the beneficed terminal; or select, according to the channel quality information of the first link of the beneficed terminal and the channel quality information of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information of the second link, a candidate supporting terminal that has channel quality of the second link not lower than the channel quality of the first link of the beneficed terminal from the candidate supporting terminal set, and determine the selected candidate supporting terminal as the supporting terminal of the multiple UE cooperative communication for the beneficed terminal.

With reference to the fourth possible implementation manner of the fifth aspect, in a fifth possible implementation manner, the processor is further configured to determine, according to the channel quality information, which is reported by the selected candidate supporting terminal, of the first link after the terminal that has the channel quality of the second link not lower than the channel quality of the first link of the beneficed terminal is selected from the candidate supporting terminal set, whether an expected gain exceeds a set threshold, and determine the selected candidate supporting terminal as the supporting terminal of the multiple UE cooperative communication for the beneficed terminal if the expected gain exceeds the set threshold.

With reference to the fourth possible implementation manner of the fifth aspect, in a sixth possible implementation manner, the processor is further configured to acquire multiple UE cooperative communication capability information of the at least one adjacent terminal of the beneficed terminal through the interface module; and the processor is specifically configured to select, according to the multiple UE cooperative communication capability information of the at least one adjacent terminal of the beneficed terminal, terminals that are capable of supporting the multiple UE cooperative communication and have the channel quality of the first link not lower than the channel quality of the first link of the beneficed terminal from the at least one adjacent terminal of the beneficed terminal to constitute a candidate supporting terminal, select a set quantity of candidate supporting terminals from the candidate supporting terminal set based on the channel quality of the second link in descending order, and determine the selected candidate supporting terminals as the supporting terminals of the multiple UE cooperative communication for the beneficed terminal.

With reference to the third or fifth possible implementation manner of the fifth aspect, in a seventh possible implementation manner, the interface module is specifically configured to receive the proximity relationship information reported by a terminal; and the processor is specifically configured to acquire the multiple UE cooperative communication capability information of the at least one adjacent terminal of the beneficed terminal from the proximity relationship information received by the interface module.

With reference to the fourth possible implementation manner of the fifth aspect, in an eighth possible implementation manner, the interface module is specifically configured to receive the proximity relationship information reported by a terminal; and the processor is specifically configured to acquire the channel quality information of the second link of the at least one adjacent terminal of the beneficed terminal from the proximity relationship information received by the interface module.

With reference to the second or fourth possible implementation manner of the fifth aspect, in a ninth possible implementation manner, the processor acquires the channel quality information of the first link of the beneficed terminal and the channel quality information of the first link of the at least one adjacent terminal of the beneficed terminal in the following manner: acquiring, through the interface module for a terminal that is in an active state in the at least one adjacent terminal of the beneficed terminal, a measurement report reported by the terminal that is in the active state and acquiring, according to the measurement report reported by the terminal that is in the active state, the channel quality information of the first link; and paging, through the interface module for a terminal that is in an idle state in the at least one adjacent terminal of the beneficed terminal, the terminal that is in the idle state, acquiring a measurement report reported after the terminal that is in the idle state enters the active state, and acquiring, according to the measurement report reported after the terminal that is in the idle state enters the active state, the channel quality information of the first link; or acquiring, according to information, which is received by the interface module, of the at least one adjacent terminal, the channel quality information of the first link of the at least one adjacent terminal of the beneficed terminal, where the information of the at least one adjacent terminal includes the channel quality information of the first link of the at least one adjacent terminal.

With reference to the fifth aspect, in a tenth possible implementation manner, the interface module is specifically configured to receive information of the at least one adjacent terminal that is measured by means of proximity discovery and reported by the beneficed terminal of the multiple UE cooperative communication and/or the supporting terminal of the multiple UE cooperative communication, and the processor is specifically configured to determine, according to the information, which is received by the interface module, of the at least one adjacent terminal, the beneficed terminal of the multiple UE cooperative communication and the at least one adjacent terminal of the beneficed terminal; or the processor detects position information of the beneficed terminal and supporting terminal of the multiple UE cooperative communication through the interface module and determine, according to the detected terminal position information, the beneficed terminal of the multiple UE cooperative communication and the at least one adjacent terminal of the beneficed terminal.

With reference to the fifth aspect and any one of the first to tenth possible implementation manners of the fifth aspect, in an eleventh possible implementation manner, the interface module is further configured to receive a multiple UE cooperative communication trigger request reported by the beneficed terminal and/or the at least one adjacent terminal of the beneficed terminal, where the multiple UE cooperative communication trigger request carries information of the beneficed terminal; and the processor is further configured to discard the multiple UE cooperative communication trigger request if it is decided that the multiple UE cooperative communication does not need to be triggered for the beneficed terminal corresponding to the information, which is carried in the multiple UE cooperative communication trigger request, of the beneficed terminal.

With reference to the eleventh possible implementation manner of the fifth aspect, in a twelfth possible implementation manner, the multiple UE cooperative communication trigger request further carries the candidate supporting terminal set of the beneficed terminal corresponding to the information of the beneficed terminal; and the processor is specifically configured to: after the supporting terminal of the multiple UE cooperative communication is determined for the beneficed terminal according to the channel quality information of the beneficed terminal and the at least one adjacent terminal of the beneficed terminal, acquire an intersection of the supporting terminal of the multiple UE cooperative communication, which is determined for the beneficed terminal according to the channel quality information of the beneficed terminal and the at least one adjacent terminal of the beneficed terminal, and the candidate supporting terminal set carried in the multiple UE cooperative communication trigger request, and use a terminal acquired by acquiring the intersection as the supporting terminal of the multiple UE cooperative communication for the beneficed terminal.

A sixth aspect provides a terminal device, including an interface module, a processor, and a memory, where the processor is configured to perform measurement through the interface module to acquire at least one adjacent terminal of the terminal, save information of the at least one adjacent terminal acquired by the measurement in the memory, and report measured terminal proximity relationship information to a network device through the interface module, where the terminal proximity relationship information includes at least a device to device D2D code of the at least one adjacent terminal and the information of the at least one adjacent terminal is used for the network device to determine a beneficed terminal of multiple UE cooperative communication and at least one adjacent terminal of the beneficed terminal and make a decision on whether to trigger the multiple UE cooperative communication for the beneficed terminal.

With reference to the sixth aspect, in a first possible implementation manner, the terminal proximity relationship information that the processor reports to the network device through the interface module further includes one piece of or a combination of the following information: channel quality information of a first link of the at least one adjacent terminal, where the first link is a link between the at least one adjacent terminal and the network device; channel quality information of a second link of the at least one adjacent terminal, where the second link is a link between the at least one adjacent terminal and the terminal reporting the information of the at least one adjacent terminal; and multiple UE cooperative communication capability information of the at least one adjacent terminal.

With reference to the sixth aspect, in a second possible implementation manner, the processor is specifically configured to select a to-be-reported adjacent terminal from the measured terminal proximity relationship information and report information of the selected adjacent terminal to the network device, where a manner of selecting the to-be-reported adjacent terminal from the measured terminal proximity relationship information includes: filtering, according to a multiple UE cooperative communication capability of the at least one adjacent terminal of the terminal, the at least one adjacent terminal acquired by the measurement performed by the processor; or selecting, according to channel quality of a first link of the terminal and channel quality of a first link of the at least one adjacent terminal of the terminal, a terminal that has the channel quality of the first link not lower than the channel quality of the first link of the terminal from the at least one adjacent terminal, where the first link is a link between the terminal and the network device; or selecting, according to channel quality of a second link of the terminal and channel quality of a second link of the at least one adjacent terminal of the terminal, a set quantity of terminals from the at least one adjacent terminal of the terminal based on the channel quality of the second link in descending order; or selecting a terminal that has channel quality of a second link not lower than a set threshold from the at least one adjacent terminal; or calculating, according to channel quality of first and second links of the at least one adjacent terminal of the terminal, a value of a weighted sum of the channel quality of the first link and the channel quality of the second link, and selecting a set quantity of terminals from the at least one adjacent terminal based on channel quality, which is acquired after weighted summation, in descending order.

With reference to the sixth aspect or the first possible implementation manner of the sixth aspect, in a third possible implementation manner, the processor is further configured to: send a multiple UE cooperative communication trigger request to the network device through the interface module when the terminal is the beneficed terminal of the multiple UE cooperative communication and a current service rate of the terminal is less than an expected service rate; or send a multiple UE cooperative communication trigger request to the network device through the interface module when the terminal is a supporting terminal of the multiple UE cooperative communication and the terminal determines that a gain of a second link with the beneficed terminal of UE cooperative communication reaches an expected gain threshold.

With reference to the third possible implementation manner of the sixth aspect, in a fourth possible implementation manner, the processor is further configured to: before the multiple UE cooperative communication trigger request is sent to the network device through the interface module, determine a candidate supporting terminal set of the beneficed terminal of the multiple UE cooperative communication and carry the determined candidate supporting terminal set of the beneficed terminal of the multiple UE cooperative communication in the multiple UE cooperative communication trigger request for sending.

According to the foregoing embodiments, a network device determines, according to terminal proximity relationship information reported by a terminal, a beneficed terminal of multiple UE cooperative communication and at least one adjacent terminal of the beneficed terminal, makes, according to channel quality of the beneficed terminal and the at least one adjacent terminal of the beneficed terminal, a decision on whether to trigger the multiple UE cooperative communication, and selects a cooperative UE set for the beneficed terminal on which it is decided to perform the multiple UE cooperative communication (that is, selects a supporting terminal for the beneficed terminal), which implements the decision on whether to trigger the multiple UE cooperative communication and the selection of a proper cooperative set UE for the beneficed terminal, thereby finally improving service quality of a UE and overall performance of a network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6A is a schematic diagram of a format of a D2D Discovery message sent by a UE according to an embodiment;

FIG. 6B is a schematic diagram of a format of an information unit in an adjacent-UE list reported by a UE according to another embodiment;

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
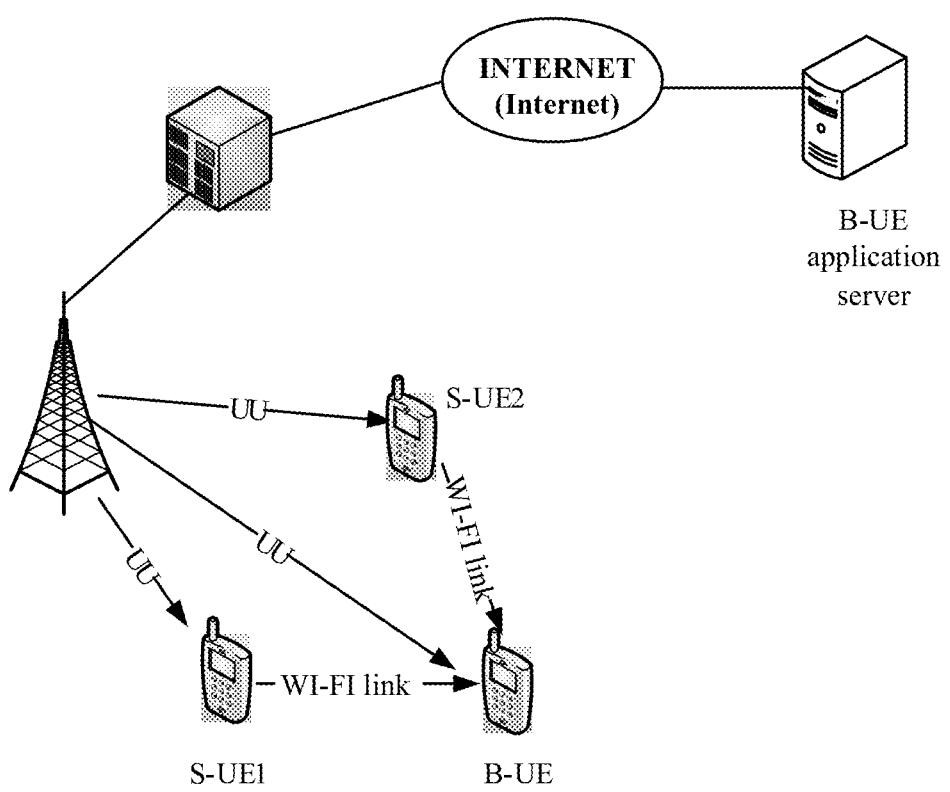
FIG. 1 is a schematic diagram of multiple UE cooperative communication in the prior art.

FIG. 1 is a schematic diagram of a type of multiple UE cooperative communication, where an S-UE1, an S-UE2, and a B-UE are terminals in a same Wi-Fi (Wireless Fidelity) network. The S-UE1 and the S-UE2 are supporting UEs of multiple UE cooperative communication of the B-UE, and the B-UE is a beneficed terminal. An eNB (evolved NodeB, namely, a base station) sends downlink data to the S-UE1 and the S-UE2 through a UU interface. The S-UE1 and the S-UE2 send the data to the B-UE through a WI-FI link. Because different paths have different channel quality at different moments, a multiple UE cooperative communication technology can be used to select a best link or a plurality of links at each moment for communication transmission so that the B-UE acquires a multiple UE diversity gain. FIG. 1 is merely an example in which a second-hop link between UEs is a WI-FI link. However, the second-hop link is not limited to the WI-FI link and may also be a D2D link type specified in other D2D communication standards.

To use a multiple UE cooperative communication technology to improve spectrum utilization, a service rate of a UE, and in particular, an edge rate, an important problem that needs to be solved is how to trigger multiple UE cooperative communication in a timely manner and how to accurately find a cooperative UE set for a B-UE. Embodiments provide a mechanism of triggering, according to a UE proximity relationship, multiple UE cooperative communication and a scheme for accurately selecting a cooperative UE set for a B-UE.

To facilitate understanding of the embodiments, conventions followed in the embodiments of the present invention are first described as follows:

(1) A near field communication technology involved in the embodiments may include a WLAN (wireless local area network) technology, a Bluetooth technology, a Zigbee (a wireless network protocol for low-speed near field transmission) technology, or the like, and specific examples are not listed herein.

(2) All UEs involved in the embodiments are UEs having a proximity discovery function and enabled with the proximity discovery function.

The following describes the embodiments in detail with reference to the accompanying drawings.

Figure 2:
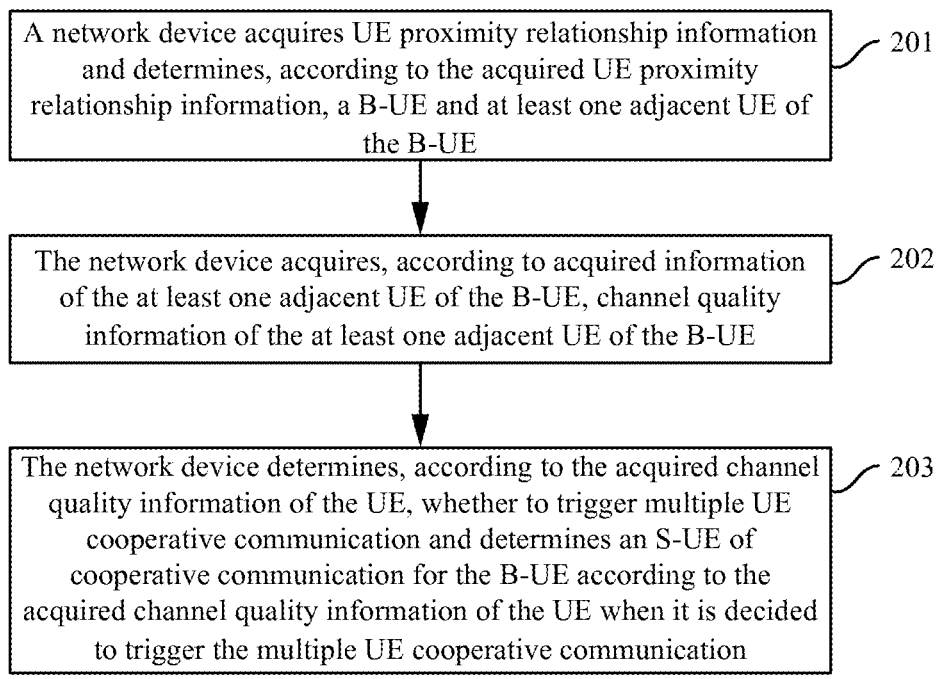
FIG. 2 is a general schematic flowchart for making a decision on whether to trigger multiple UE cooperative communication according to an embodiment.

Referring to FIG. 2 that is a general schematic flowchart for making a decision on whether to trigger MUCC according to an embodiment, the process includes the following steps.

Step 201: A network device acquires UE proximity relationship information and determines, according to the acquired UE proximity relationship information, a B-UE and at least one adjacent UE of the B-UE. The UE proximity relationship information may be expressed as an adjacent-UE list. The adjacent-UE list includes at least a unique identifier of a UE, for example, a D2D Code of the UE. The network device may acquire the UE proximity relationship information in either of the following manners.

Manner 1: reported by a UE. Specifically, by means of measurement and reporting, the UE may report a UE measured by using a proximity discovery technology as an adjacent UE. The network device may determine, according to capabilities of terminals, the B-UE and S-UEs that are capable of providing a support service.

Manner 2: sensed by the network device itself. Specifically, the network device may sense a proximity relationship between UEs by using an automatic sensing technology. Because a UE proximity relationship is sensed by a base station, a UE does not need to report UE proximity relationship information, thereby reducing overloads of network resources.

In the foregoing manner 1, the UE reporting the UE proximity relationship information may be the B-UE, the S-UEs that are capable of providing a support service, or both the B-UE and the S-UEs. If the UE reporting the UE proximity relationship information is the B-UE, the network device may directly acquire the at least one adjacent UE of the B-UE according to content reported by the B-UE. If the UE reporting the UE proximity relationship information is the S-UEs that are capable of providing a support service, the network device may acquire the at least one adjacent UE of the B-UE by synthesizing content reported by each S-UE. For example, if an adjacent UE reported by an S-UE1 and an adjacent UE reported by an S-UE2 both include a B-UE1, adjacent UEs of the B-UE1 include the S-UE1 and the S-UE2.

Step 202: The network device acquires, according to acquired information of the at least one adjacent UE of the B-UE, channel quality information of the at least one adjacent UE of the B-UE.

Step 203: The network device determines, according to the acquired channel quality information of the at least one UE, whether to trigger multiple UE cooperative communication and determines a cooperative UE set according to the acquired channel quality information of the UE, that is, determines an S-UE of cooperative communication for the B-UE when it is decided to trigger the multiple UE cooperative communication.

Based on an assumption that the network device is a base station, the following describes the embodiments in detail with reference to specific embodiments.

Embodiment 1

Figure 3:
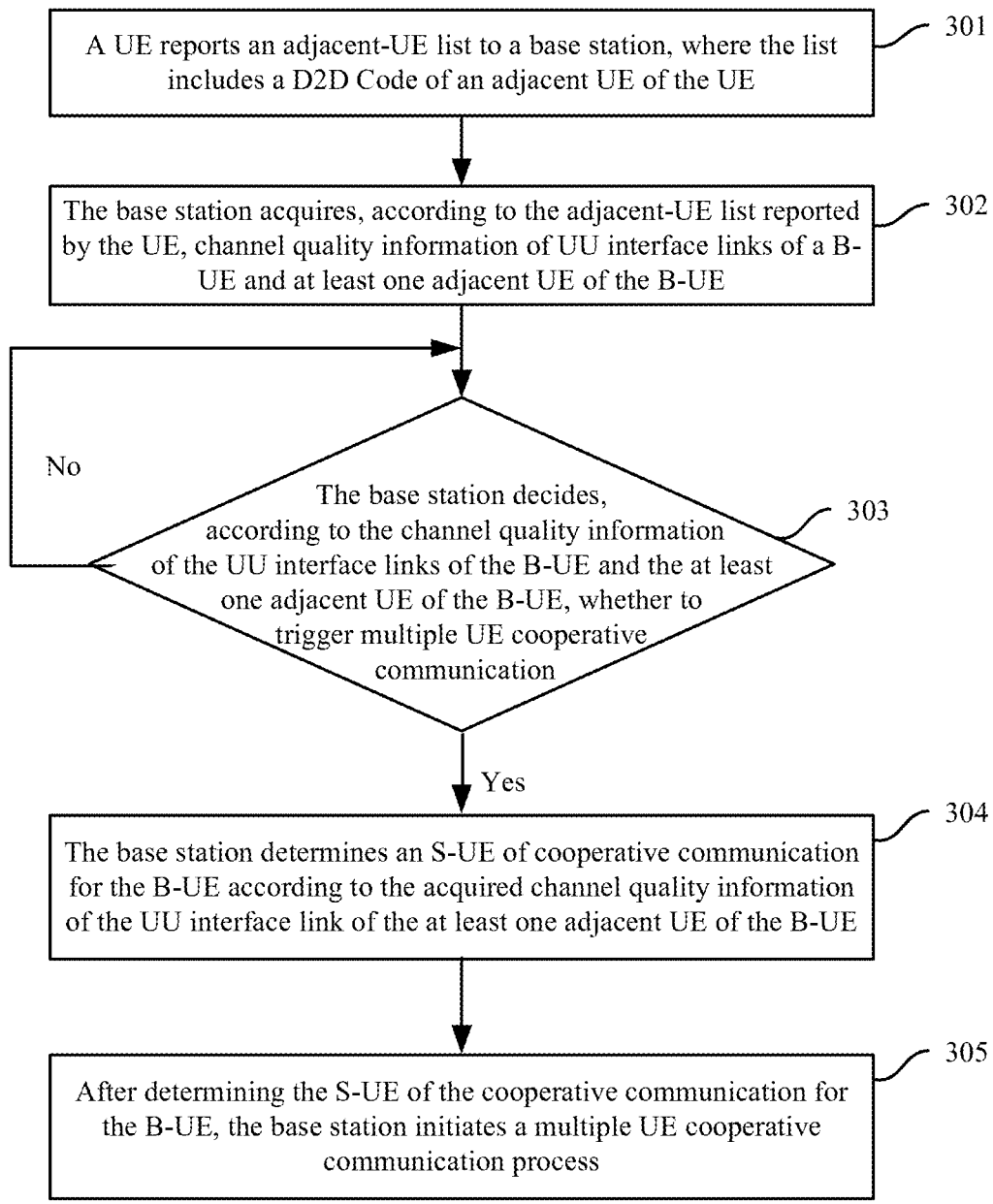
FIG. 3 is a schematic flowchart for making a decision on whether to trigger multiple UE cooperative communication according to an embodiment.

FIG. 3 is a schematic flowchart for triggering multiple UE cooperative communication according to Embodiment 1. In this process, a base station acquires channel quality of related UEs according to an adjacent-UE list reported by a B-UE and makes, based on the acquired channel quality of the related UEs, a decision on whether to trigger the multiple UE cooperative communication. As shown in FIG. 3, this process may include the following steps:

Step 301: A UE reports an adjacent-UE list measured by using a proximity discovery technology to a base station. The UE reporting the adjacent-UE list may be a B-UE or S-UEs or may also include the B-UE and S-UEs. The list includes a unique identifier of an adjacent UE, for example, a D2D Code of the UE. Further, the list may also include a PCI (Physical Cell ID, physical cell identifier) of the UE, and the like.

In the proximity discovery technology, a UE generally sends a D2D Discovery message (also known as a Discovery Beacon (discovery beacon) signal). The signal carries a D2D code of the UE and is used for signal probing and mutual discovery between UEs. In this embodiment of the present invention, a UE may discover its adjacent UE by receiving a D2D Discovery message that is broadcast by the adjacent UE and carries a D2D Code, or may also discover its adjacent UE by using a social application.

Step 302: The base station acquires, according to the adjacent-UE list reported by the UE, channel quality information of UU interface links of a B-UE and at least one adjacent UE of the B-UE.

During specific implementation, as mentioned above, if the UE reporting the adjacent-UE list is the B-UE, the base station may directly acquire the at least one adjacent UE of the UE according to content reported by the B-UE; if the UE reporting the adjacent-UE list is S-UEs that are capable of providing a support service, the base station may acquire the at least one adjacent UE of the B-UE by synthesizing content reported by each S-UE. After acquiring the at least one adjacent UE of the B-UE, the base station acquires the channel quality information of the UU interface links of the B-UE and the at least one adjacent UE of the B-UE.

Step 303: The base station decides, according to the acquired channel quality information of the UU interface links of the B-UE and the at least one adjacent UE of the B-UE, whether to trigger multiple UE cooperative communication. If the base station decides to trigger the multiple UE cooperative communication, step 304 is executed; if the base station does not decide to trigger the multiple UE cooperative communication, a next decision is waited for.

Step 304: The base station determines an S-UE of cooperative communication for the B-UE according to the acquired channel quality information of the UU interface link of the at least one adjacent UE of the B-UE.

Step 305: After determining the S-UE of the cooperative communication for the B-UE, the base station initiates a multiple UE cooperative communication process, including sending a cooperative communication pairing request to UEs (the B-UE and the S-UE of the B-UE) participating in the multiple UE cooperative communication.

The following describes exemplary implementation manners of the steps in the process shown in FIG. 3 in detail.

In step 301 of the process shown in FIG. 3, the B-UE may report, according to a measurement reporting rule, the adjacent-UE list measured by using the proximity discovery technology to the base station.

The measurement reporting rule may specify a reporting type. The reporting type may include periodic reporting, event-triggered reporting, and a combination of periodic reporting and event-triggered reporting. Accordingly, the B-UE reports, according to the measurement reporting rule and a set period, the adjacent-UE list measured by using the proximity discovery technology to the base station, or reports the adjacent-UE list measured by using the proximity discovery technology to the base station when a specific event occurs, or reports the adjacent-UE list measured by using the proximity discovery technology to the base station by combining the periodic reporting and event-triggered reporting manners. The specific event may be as follows: a proximity relationship is reported when the B-UE probes, by using a received D2D Discovery (namely, Discovery Beacon) signal, that signal quality of a UD interface (namely, an interface of a second-hop link between the B-UE and the at least one adjacent UE) of the at least one adjacent UE is higher than a certain threshold. The threshold may be unique to each UE. The threshold may be configured on a network side or may also be acquired by the B-UE by measuring a network RS (reference signal).

The measurement reporting rule may further specify a reporting manner. The reporting manner includes reporting by using an RRC (Radio Resource Control) protocol message or reporting through an MCE (MAC Control Element, where MAC is short for Media Access Control). Accordingly, the B-UE may report information of the at least one adjacent UE by using the RRC message in a manner similar to a Measurement Report, or may also report information of the at least one adjacent UE through the MCE.

The measurement reporting rule may further specify reported content. Accordingly, the adjacent-UE list reported by the B-UE includes an identifier used to identify an UE, for example, a D2D Code, and may further include a PCI and the like.

Further, the reported content specified in the measurement reporting rule may also include the channel quality information of the UU interface link of the B-UE. To reduce an amount of information reported by a UE, channel quality may be classified into a plurality of fading levels in advance according to RSRP (Reference Signal Receiving Power) or a CQI (Channel Quality Indicator); or channel quality may be converted into an RSRP level or a CQI level. When performing channel quality measurement on the UU interface link, the UE may complete downlink measurement based on an RS (Reference Signal) of a camping cell, convert a measurement result into a fading level parameter, an RSRP level parameter, or a CQI level parameter, carry the converted level parameter in the proximity relationship information reported to the base station, and send the proximity relationship information to the base station.

FIG. 6A shows a format of a D2D Discovery message sent by a UE. The message format is only an example. In the message format shown in FIG. 6A, various parts are described as follows:

PCI field: 1 byte long and used to carry a PCI of a sender UE. The PCI may be a Truncated PCI to reduce an amount of reported information.

MUCC Capacity field: 4 bits long and used to carry MUCC capability information of the sender UE.

UU Energy Level field: 4 bits long and used to carry capability level information of a large-scale fading and a path loss of a UU interface link between the sender UE and a base station.

D2D Code list: used to carry information of at least one adjacent UE that the sender UE detects by using a proximity discovery technology, mainly including a D2D Code of the at least one adjacent UE.

Further, to reduce system overheads and improve cooperative communication efficiency and measurement efficiency, the foregoing measurement reporting rule may further specify a filtering rule so that B-UE filters, according to the filtering rule, the at least one adjacent UE measured by using the proximity discovery technology and reports information of the at least one adjacent UE after the filtering to the base station. A filtering operation performed by the B-UE according to the filtering rule may include one or a combination (for example, a combination of the following filtering rule 1 and the following filtering rule 2, 3, 4, or 5) of the following:

Filtering rule 1: The B-UE performs filtering according to an MUCC capability of the at least one adjacent UE. For example, if an adjacent UE is capable of supporting an S-UE, information of the adjacent UE is reported. If an adjacent UE is not capable of supporting the S-UE, the adjacent UE is filtered out. In the proximity discovery technology, an MUCC capability is generally carried in a D2D Code for sending or is sent with a D2D Code together. The MUCC capability is broadcast by a UE. The B-UE may acquire the MUCC capability of the at least one adjacent UE according to received information broadcast by the at least one adjacent UE. By means of the filtering operation, an adjacent UE with a certain MUCC capability can be identified and reported.

Filtering rule 2: The B-UE performs filtering according to channel quality of the UU interface links of the B-UE and each adjacent UE. In an exemplary manner, the B-UE compares the measured channel quality of the UU interface link of the at least one adjacent UE with the measured channel quality of the UU interface link of the B-UE, and reports an adjacent UE that has the channel quality of the UU interface link better or not lower than the channel quality of the UU interface link of the B-UE. For example, if the B-UE determines that a large-scale fading between an adjacent UE1 and the base station is less than or equal to a large-scale fading between the B-UE and the base station, the adjacent UE1 is reported as an adjacent UE; if the B-UE determines that a large-scale fading between an adjacent UE1 and the base station is greater than a large-scale fading between the B-UE and the base station, information of the adjacent UE1 is not reported. Further, when the large-scale fadings of the UU interface links are compared, an impact of ICIC (Inter-Cell Interference Coordination) may be considered.

The at least one adjacent UE may use the proximity discovery technology to broadcast information about quality, which is measured by the at least one adjacent UE, of the UU interface link, for example, broadcast the information about the quality of the UU interface link by using a D2D Code. Other UEs (for example, the B-UE) may acquire, according to the received D2D Code broadcast by the UE, the channel quality information of the UU interface link of the at least one adjacent UE.

By means of the filtering operation, an adjacent UE that has the channel quality of the UU interface link not lower than the channel quality of the UU interface link of the B-UE is reported.

Filtering rule 3: The B-UE performs filtering according to channel quality of a UD interface link between each adjacent UE and the B-UE. An exemplary manner is as follows: The B-UE sorts the channel quality of the UD interface links between the adjacent UEs and the B-UE, selects N (a value of N may be preset) adjacent UEs according to the channel quality of the UD interface links in descending order, and reports the selected adjacent UEs. Another exemplary manner is as follows: The B-UE compares the channel quality of the UD interface links between the adjacent UEs and the B-UE with a preset threshold (the threshold may be determined according to a factor such as the near field communication technology used by the UE) and reports an adjacent UE that has the channel quality of the UD interface link higher than the threshold. A manner used by the UE to measure the channel quality of the UD interface link is the same as that mentioned above.

Filtering rule 4: The B-UE performs filtering according to channel quality of a UD interface link between the at least one adjacent UE and the B-UE and channel quality of the UU interface link of the at least one adjacent UE. A manner used by the B-UE to acquire the channel quality information of the UU interface link of the at least one adjacent UE and channel quality information of the UD interface link is the same as that mentioned above. In an exemplary manner, a weight is preset for the UU interface link and the UD interface link separately. For each measured adjacent UE, the B-UE multiplies channel quality that is measured based on a UU interface, between the at least one adjacent UE and the base station and channel quality that is measured based on a UD interface, between the at least one adjacent UE and the B-UE by the weight of the UU interface link and the weight of the UD interface link respectively, performs addition, and selects, according to a calculation result, an adjacent UE that has good comprehensive channel quality for reporting. For example, in a situation in which the channel quality is represented by a large-scale fading, after the foregoing weight calculation, an adjacent UE that has a smallest large-scale fading may be reported. By means of the filtering operation, an adjacent UE that has the best channel quality may be selected based on comprehensive consideration of the channel quality of the UU interface link and the UD interface link and reported.

Further, when filtering is performed based on the comprehensive consideration of the channel quality of the UU interface link and the UD interface link, information, such as resource utilization of the UU interface link and the UD interface link, an antenna configuration, and the like, may be considered. For example, a calculation is performed based on spectrum utility functions of the UU interface and the UD interface. That is, the spectrum efficiency (represented by a CQI in an LTE protocol; Long Term Evolution) of a UU interface of a UE is converted according to RB (Resource Block) utilization and a size of a transport TB (Transport Block) of the UU interface of the UE. The UD interface determines, according to an adopted D2D technology, a method of calculating the spectrum efficiency. In an LTE-based D2D technology, the spectrum efficiency may be converted according to a transmission rate and RB utilization of the UD interface. In a WI-FI Direct technology, the spectrum efficiency of the UD interface and the spectrum efficiency of the UU interface may be converted according to an actual WI-FI-based transmission service rate and the number of RBs used by the S-UE on the UU interface. The antenna configuration is a factor that needs to be considered for calculating the spectrum efficiency. For example, 2T2R has a spectrum efficiency gain twice that of 1T2R under a low correlation channel.

The foregoing filtering rules and the manners of filtering the adjacent UEs according to the filtering rules are only exemplary implementation manners, and all filtering rules implemented based on the foregoing principles and corresponding filtering manners fall within the protection scope of the present invention.

The foregoing measurement reporting rule may be broadcast to the UE by the network device (for example, the base station). A default measurement reporting rule may also be configured for a UE having an MUCC capability. For example, the measurement reporting rule is used as a default rule and included in a communication protocol.

In step 302 of the process shown in FIG. 3, the network device may, according to a state of the UE (including the B-UE and the at least one adjacent UE reported by the B-UE), use different manners to acquire channel quality of the UE. Specifically, a UE that is in an Active state may report measured channel quality information of a UU interface link to the base station. Therefore, for the UE in the active state, the base station may directly acquire the channel quality information, which is reported by the UE, of the UU interface link, for example, a CQI or channel quality information measured based on an SRS (sounding reference signal) and/or a DMRS (demodulation reference signal). The CQI is used for quality measurement of a downlink channel of the UU interface and the SRS is used for quality measurement of an uplink channel. In a TDD system, channel quality may be directly applied to a downlink based on channel reciprocity. In FDD, uplink and downlink large-scale fadings may be equivalent. For a UE that is in an idle state, the base station connects the UE to a system by paging the UE. After entering the Active state, the UE reports channel quality information, for example, a CQI, of a UU interface link to the base station so that the base station can acquire channel quality of the UU interface link of the UE.

According to the foregoing descriptions of the measurement reporting rule, the B-UE may carry the channel quality information of the UU interface link of the UE in the adjacent-UE list reported to the network device. Therefore, the network device may also acquire the channel quality of the UU interface link of the UE according to the adjacent-UE list reported by the B-UE. In a situation in which a UE having a support capability also reports the proximity relationship information and the manner of carrying channel quality information of a UU interface link of the current UE in the reported adjacent-UE list is used, for a UE that is in an idle state in the at least one adjacent UE reported by the B-UE, the network device may acquire channel quality of the UU interface link of the UE without paging the UE, thereby reducing network resource overheads and paging processing overheads on the network device and the UE.

In step 303 of the process shown in FIG. 3, the base station decides to trigger the multiple UE cooperative communication for the B-UE if it is determined, according to the channel quality information of the UU interface links of the B-UE and the at least one adjacent UE reported by the B-UE, that the at least one adjacent UE of the B-UE includes a UE that has the channel quality of the UU interface link not lower than the channel quality of the UU interface link of the B-UE. For example, the base station decides to trigger the multiple UE cooperative communication for the B-UE if it is determined, according to large-scale fading and path loss levels of the UU interface links of the B-UE and the at least one adjacent UE reported by the B-UE, that the at least one adjacent UE of the B-UE includes a UE that has the large-scale fading and path loss levels less than or equal to the large-scale fading and path loss levels of the B-UE.

In step 304 of the process shown in FIG. 3, after determining that the cooperative communication needs to be triggered for the B-UE, the base station may further determine, according to the channel quality information of the UU interface links of the B-UE and the at least one adjacent UE reported by the B-UE, the S-UE of the cooperative communication for the B-UE from the at least one adjacent UE reported by the B-UE. Preferably, the base station selects, according to the channel quality of the UU interface link of the at least one adjacent UE reported by the B-UE, all or some adjacent UEs that have the channel quality of the UU interface link not lower than the channel quality of the B-UE (for example, selects a certain quantity of adjacent UEs that have good channel quality according to the channel quality in descending order) as the S-UEs of the cooperative communication for the B-UE.

In step 305 of the process shown in FIG. 3, the cooperative communication pairing request sent by the base station carries a D2D Code of the B-UE and a D2D Code of the S-UE of the B-UE. The base station may use any one of the following manners to send the cooperative communication pairing request to the UEs participating in the multiple UE cooperative communication.

Manner 1: first sending the cooperative communication pairing request to the B-UE and then sending the cooperative communication pairing request to the S-UE.

Manner 2: first sending the cooperative communication pairing request to the S-UE and then sending the cooperative communication pairing request to the B-UE.

Manner 3: sending the cooperative communication pairing request to the B-UE and the S-UE simultaneously.

Figure 4A:
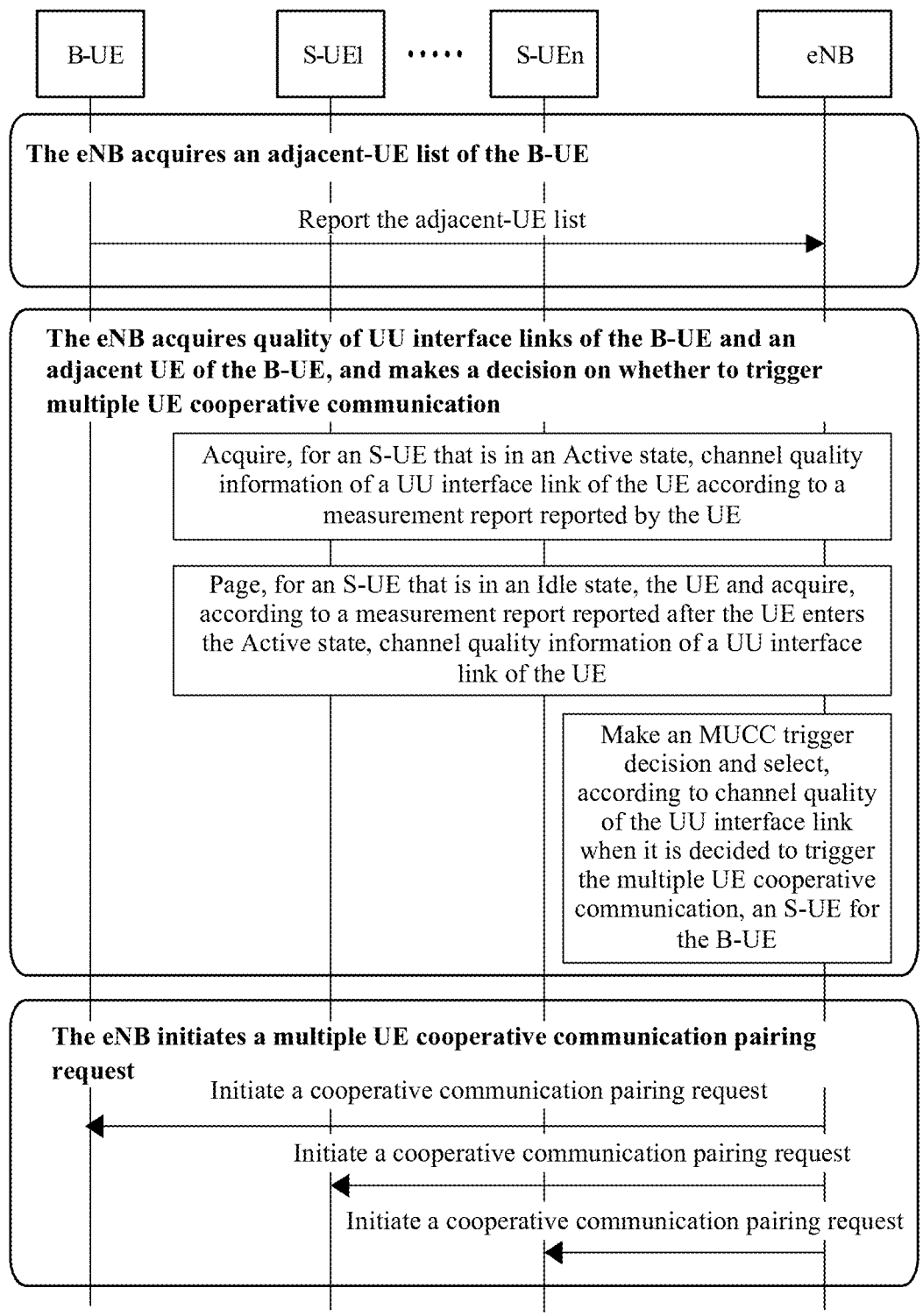
FIG. 4A and FIG. 4B are schematic signaling flowcharts for making a decision on whether to trigger multiple UE cooperative communication according to an embodiment.
Figure 4B:
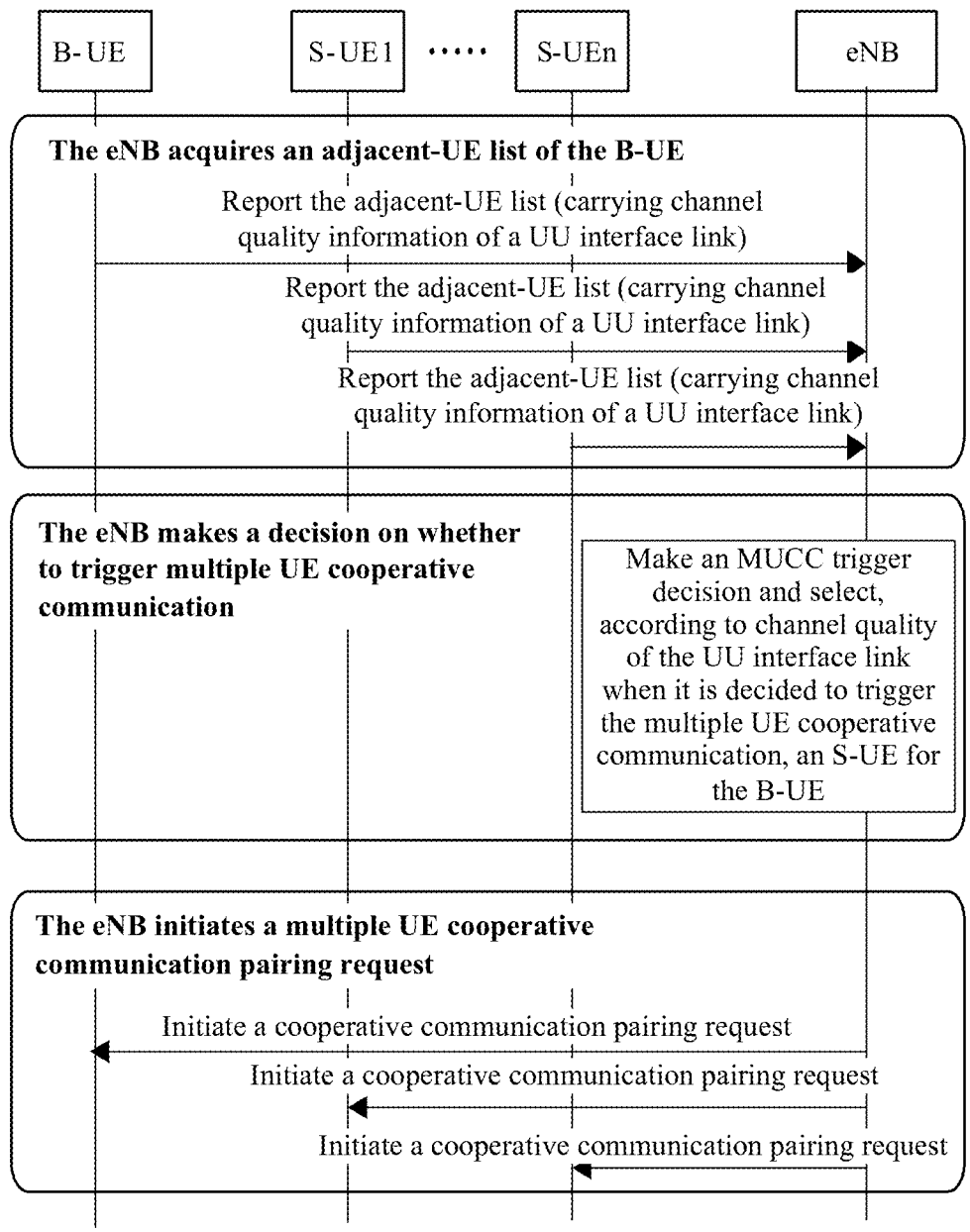

According to the foregoing descriptions, FIG. 4A and FIG. 4B show a signaling interaction process between a UE and an eNB separately.

In the process shown in FIG. 4A, a B-UE reports an adjacent-UE list to an eNB; the eNB acquires, for a UE that is in an Active state in the adjacent-UE list, channel quality of a UU interface link of the UE according to a measurement report reported by the UE, and pages, for a UE that is in an Idle state in the adjacent-UE list, the UE to enable the UE to enter the Active state and acquires, according to a measurement report reported by the UE after the UE enters the Active state, channel quality of a UU interface link of the UE; the eNB makes, according to the acquired channel quality of the UU interface links of the B-UE and at least one adjacent UE of the B-UE, a decision on whether to trigger multiple UE cooperative communication and initiates a cooperative communication pairing request to the B-UE and an S-UE of the B-UE after it is decided to trigger the multiple UE cooperative communication.

In the process shown in FIG. 4B, both a B-UE and an S-UE report an adjacent-UE list to an eNB, where the reported adjacent-UE lists carry channel quality information of UU interface links; the eNB makes, according to acquired channel quality of the UU interface links of the B-UE and at least one adjacent UE of the B-UE, a decision on whether to trigger multiple UE cooperative communication and initiates a cooperative communication pairing request to the B-UE and an S-UE of the B-UE after it is decided to trigger the multiple UE cooperative communication.

The processes in Embodiment 1 show that a network device determines, according to an adjacent-UE list reported by a UE, a B-UE and at least one adjacent UE of the B-UE, makes, according to channel quality of UU interface links of the B-UE and the at least one adjacent UE of the B-UE, a decision on whether to trigger MUCC, selects a cooperative UE set for the B-UE on which it is decided to perform the MUCC (that is, selects an S-UE for the B-UE), which implements the decision on whether to trigger the MUCC and the selection of a proper cooperative set UE for the B-UE, thereby finally improving service quality of a UE and overall performance of a network.

Embodiment 2

Based on Embodiment 1, in this embodiment, an eNB further acquires supplementary information used to improve accuracy of a decision on whether to trigger cooperative communication and selects, with reference to the supplementary information, an S-UE for a B-UE, thereby improving the cooperative communication efficiency. The supplementary information is mainly used for supplementary decision on whether to trigger multiple UE cooperative communication. The supplementary information may include quality information of a second-hop link (namely, a UD interface link) between the B-UE and an adjacent UE, for example, an energy level indicating a large-scale fading and a path loss of a UD interface link between UEs, the supplementary information may include MUCC capability information of a UE, or the supplementary information includes channel quality information of a second-hop link between the B-UE and the S-UE as well as MUCC capability information of a UE. An MUCC capability may include: a capability of supporting MUCC (whether MUCC is supported), a capability of supporting a B-UE (whether can be used as the B-UE), a capability of supporting the S-UE (whether can be used as the S-UE), a capability of supporting a friend as the S-UE, a capability of supporting a friend as the B-UE, and the like.

The following describes a process of Embodiment 2 in detail based on an assumption that an adjacent-UE list reported by a UE includes channel quality information of a UD interface link of at least one adjacent UE.

The process of Embodiment 2 is basically similar to the process shown in FIG. 3. The following focuses only on improved steps in Embodiment 2 compared with Embodiment 1.

Figure 5:
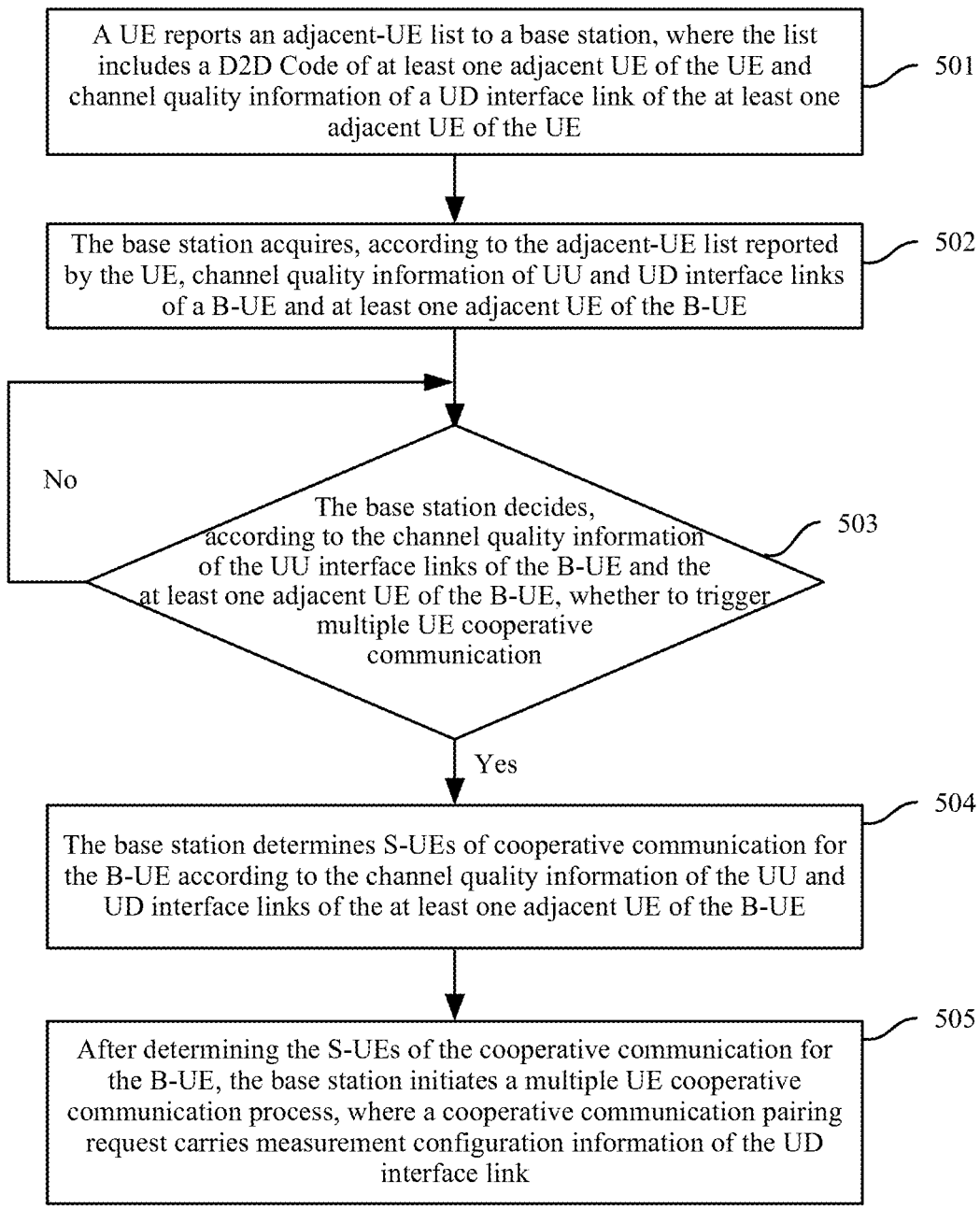
FIG. 5 is a schematic flowchart for making a decision on whether to trigger multiple UE cooperative communication according to another embodiment.

FIG. 5 is a schematic flowchart for triggering multiple UE cooperative communication according to Embodiment 2. In this process, a base station acquires channel quality of related UEs and supplementary information according to an adjacent-UE list reported by a B-UE, and makes, based on the acquired channel quality of the related UEs and the supplementary information, a decision on whether to trigger the multiple UE cooperative communication. As shown in FIG. 5, this process may include the following steps:

Step 501: A UE reports an adjacent-UE list measured by using a proximity discovery technology to a base station, where the adjacent-UE list includes channel quality information of a UD interface link of at least one adjacent UE.

In this step, the UE reporting the adjacent-UE list may be an S-UE or include a B-UE and an S-UE. The adjacent-UE list includes at least a unique identifier of the at least one adjacent UE, for example, a D2D Code of the UE. The adjacent-UE list further includes supplementary information used for making a decision on whether to trigger multiple UE cooperative communication, where the supplementary information includes at least the channel quality information of the UD interface link of the at least one adjacent UE.

During specific implementation, a reporting rule may specify reporting of channel quality information of a UD interface link between UEs. In this case, the UE may acquire channel quality of a UD interface link between the B-UE and the at least one adjacent UE by detecting the channel quality of the UD interface link of the at least one adjacent UE discovered by the UE, and may further grade the detected channel quality of the UD interface link. For example, signal strength of a D2D Discovery (namely, Discovery Beacon) signal may be used to detect the channel quality of the UD interface link, and the detected channel quality is represented by an RSRP level or a CQI level and is carried in the adjacent-UE list for reporting. The UE may also acquire the channel quality information, which is detected by the at least one adjacent UE and sent in a broadcasting manner, of the UD interface link from a broadcast signal (a Discovery Beacon signal) received by the at least one adjacent UE discovered by the UE. This requires the UE to carry the detected channel quality information of the UD interface link in the D2D Discovery (Discovery Beacon) signal for sending, so that the at least one adjacent UE of the UE may acquire the channel quality information, which is carried in the D2D Discovery signal, of the UD interface link. The detected channel quality of the UD interface link may be first graded before being broadcast, for example, the detected channel quality may be represented by an RSRP level or a CQI level to reduce an amount of transmitted data.

The D2D Discovery message sent by the UE may further carry channel quality information of a UU interface link of the UE (for example, a channel quality level of the UU interface link), which is the same as the description in Embodiment 1. Further, the UE may also carry its own MUCC capability in the D2D Discovery message for sending.

FIG. 6A shows a format of the D2D Discovery message sent by the UE (for example, an S-UE). FIG. 6B shows a format of an adjacent-UE list reported by a B-UE.

After receiving a D2D Discovery message shown in FIG. 6A and reported by at least one adjacent UE, a B-UE may acquire, according to the received D2D Discovery message, the following information of the at least one adjacent UE: a D2D Code, MUCC capability information, and a channel quality level of a UU interface link. The B-UE may also acquire, according to signal strength of the D2D Discovery message, channel quality information of UD interface links of the B-UE and the at least one adjacent UE sending the D2D Discovery message, and may further quantify the channel quality information as channel quality levels of the UD interface links. In a situation in which a filtering rule is set, the B-UE may filter the at least one adjacent UE according to the foregoing information in the foregoing filtering manner. When the B-UE reports an adjacent-UE list to a base station, reported information of the at least one adjacent UE includes the D2D Code at least, and may further include information such as the channel quality level of the UU interface link, a channel quality level of the UD interface link. The channel quality level of the UU interface link is from the D2D Discovery message sent by the at least one adjacent UE. The channel quality level of the UD interface link may be from the D2D Discovery message sent by the at least one adjacent UE or may be measured by the B-UE according to the signal strength of the D2D Discovery message. The adjacent-UE list that the B-UE reports to the base station may include the MUCC capability information of the at least one adjacent UE (the MUCC capability information is from the D2D Discovery message sent by the at least one adjacent UE), or may not carry the MUCC capability information of the at least one adjacent UE.

FIG. 6B shows a format of an information unit in an adjacent-UE list reported by a B-UE. The information unit may carry related information of one adjacent UE. If information of N adjacent UEs needs to be reported, N information units of this format are required.

In the information unit in the adjacent-UE list shown in FIG. 6B, various parts are described as follows:

PCI field: 6 bits long and used to carry a PCI of an adjacent UE. The PCI may be a Truncated (truncated) PCI to reduce an amount of reported information.

D2D Code: 48 bits long and used to carry a D2D Code of the adjacent UE detected by the adjacent UE by using a proximity discovery technology.

UU Energy Level field: 3 bits long and used to carry energy level information of a large-scale fading and a path loss of a UU interface link between the adjacent UE and a base station.

UD Energy Level field: 3 bits long and used to carry energy level information of a large-scale fading and a path loss of a UD interface link between the adjacent UE and the B-UE.

It should be noted that the formats shown in FIG. 6A and FIG. 6B are only exemplary implementation manners, and all message formats that are capable of carrying the foregoing information should fall within the protection scope of the present invention.

Step 502: The base station acquires, according to the adjacent-UE list reported by the UE, channel quality information of UU and UD interface links of a B-UE and at least one adjacent UE of the B-UE.

In this step, the base station may acquire the channel quality information of the UU interface link of the at least one adjacent UE in the manner in Embodiment 1, or may also acquire the channel quality information of the UU interface link of the at least one adjacent UE according to the adjacent-UE list reported by the UE in step 501.

On a basis of the acquired channel quality information of the UU interface links of the B-UE and the at least one adjacent UE of the B-UE, the base station further acquires, according to the adjacent-UE list reported by the UE in step 501, supplementary information used for making a decision on whether to trigger multiple UE cooperative communication. The supplementary information includes the channel quality information of the UD interface link and may further include MUCC capability information. If the adjacent-UE list reported by the B-UE in step 501 does not include the MUCC capability information of the at least one adjacent UE, the base station may acquire, from a device (for example, a near field server) that stores UE information, the MUCC capability information of the at least one adjacent UE of the B-UE.

Step 503: The base station decides, according to the acquired channel quality information of the UU interface links of the B-UE and the at least one adjacent UE of the B-UE, whether to trigger multiple UE cooperative communication. If the base station decides to trigger the multiple UE cooperative communication, step 504 is executed; if the base station does not decide to trigger the multiple UE cooperative communication, a next decision is waited for.

Step 504: The base station determines S-UEs of cooperative communication for the B-UE according to the channel quality information of the UU and UD interface links of the at least one adjacent UE of the B-UE.

In this step, the base station selects the S-UEs of the multiple UE cooperative communication for the B-UE according to channel quality of the UU interface links of the B-UE and the at least one adjacent UE of the B-UE and the foregoing supplementary information. The following describes several exemplary implementation manners of selecting, with reference to the supplementary information, the S-UEs for the B-UE:

Selection manner 1: The base station selects, according to the channel quality information of the UU interface link of the at least one adjacent UE of the B-UE, all adjacent UEs that have the channel quality of the UU interface link not lower than the channel quality of the UU interface link of the B-UE to acquire a candidate S-UE set of the B-UE, and selects, according to the channel quality information of the UD interface links of the B-UE and each candidate S-UE in the candidate S-UE set, one or more (a quantity may be preset) candidate S-UES as the S-UEs of the B-UE based on channel quality of the UD interface links in descending order. To further narrow down a selection range, when the candidate S-UE set is determined according to the channel quality of all the UU interface links, some adjacent UEs may be further selected based on the channel quality of all the UU interface links in descending order after all the adjacent UEs that have the channel quality of the UU interface link not lower than the channel quality of the UU interface link of the B-UE are selected, so as to acquire the candidate S-UE set of the B-UE.

Channel quality of a UU interface link of an S-UE selected in the selection manner 1 is not lower than the channel quality of the UU interface link of the B-UE, and a UD interface link of the S-UE is of high quality.

Selection manner 2: The base station first selects, from an adjacent UE set of the BUE, all UEs that support an S-UE capability and have the channel quality of the UU interface link not lower than the channel quality of the UU interface link of the B-UE as a candidate S-UE set and then selects, according to the channel quality information of the UD interface links of the B-UE and each candidate S-UE in the candidate S-UE set, one or more (a quantity may be preset) candidate S-UEs as the S-UEs of the B-UE from the candidate S-UE set based on channel quality of the UD interface links in descending order.

An S-UE selected in the selection manner 2 supports an S-UE capability and channel quality of a UU interface link of the S-UE is not lower than the channel quality of the UU interface link of the B-UE. In addition, a UD interface link of the S-UE is of high quality.

Selection manner 3: A two-step decision method (including an initial decision and a secondary decision) is used to select the S-UEs for the B-UE.

A core of the two-step decision method is: first determine the channel quality or spectrum utility of the UU interface links of the B-UE and the at least one adjacent UE, where only an adjacent UE that has the channel quality of the UU interface link not lower than the channel quality of the UU interface link of the B-UE can be used as a candidate S-UE of the B-UE; and then determine that a UD interface transmission rate of the S-UE is not less than a UU interface transmission rate of the B-UE, thereby ensuring a possibility of improving the spectrum efficiency of an entire S-UE link. Because a UD interface transmission technology has a plurality of manners, evaluation methods are different. For example, when WI-FI Direct is used as a D2D technology, a direct transmission rate may be directly compared with a transmission rate under an available RB used by a UU interface of an S-UE. If D2D in an LTE technology is used, a manner of calculating the spectrum efficiency is used for comparison because a resource reuse manner is used.

During specific implementation, an initial decision step is mainly to select the candidate S-UE for the B-UE according to the channel quality, which is reported by the UE, of the UU link and channel quality, which is reported by the UE, of the UD interface link. Specifically, the base station estimates, according to the channel quality (such as energy levels of a large-scale fading and a path loss) of the UU interface link of the at least one adjacent UE of the B-UE and the channel quality (such as energy levels of a large-scale fading and a path loss) of the UD interface link of the at least one adjacent UE of the B-UE, uplink and downlink channel quality of the UU interface link of the at least one adjacent UE of the B-UE. The base station analyzes, according to the channel quality information (such as energy levels of a large scale fading and a path loss of the link) of the UD interface link of the at least one adjacent UE of the B-UE, uplink and downlink channel quality of the UD interface link between the B-UE and the at least one adjacent UE of the B-UE. The base station selects, according to the determined uplink and downlink channel quality of the UU interface link of the at least one adjacent UE of the B-UE and the channel quality of the UD interface link, an adjacent UE meeting the following conditions as the candidate S-UE of the S-UE from these adjacent UEs: the uplink and downlink channel quality of the UU interface is not lower than the channel quality of the UU interface link of the B-UE and the channel quality of the UD interface link is not lower than the channel quality of the UU interface link of the B-UE. Based on this step, an S-UE that has the channel quality of both the UU interface and the UD interface not lower than the channel quality of the UU interface of the B-UE, that is, an S-UE that is capable of acquiring a gain, can be selected.

A secondary decision step is mainly to make a decision according to CQI information. Specifically, for the candidate S-UE acquired in the initial decision step, if the candidate S-UE is in an Active state, the base station further determines, according to a CQI of the candidate S-UE and uplink measurement information, whether an expected gain exceeds a certain threshold and uses the candidate S-UE as the S-UE of the B-UE if the expected gain exceeds the threshold; if the candidate S-UE is in an Idle state, the base station pages the candidate S-UE, further determines, according to a CQI of the candidate S-UE and uplink measurement information after the candidate S-UE accesses a system, whether an expected gain exceeds a certain threshold, and uses the candidate S-UE as the S-UE of the B-UE if the expected gain exceeds the threshold.

Using the two-step decision method to select an S-UE for a B-UE can improve the spectrum efficiency of cell resources and further improve cell throughput and a service rate of a UE, thereby improving QoE (Quality of Experience) of the UE. In addition, because channel quality information of UU and UD interface links, which is a basis of an initial decision, may be acquired from an adjacent-UE list reported by a UE, an acquisition means is simple and system overloads are low. After a candidate S-UE set is selected, a secondary decision is performed on a candidate S-UE in the candidate S-UE set according to a CQI. In this way, channel quality can be sensed more accurately.

The secondary decision step may also be an optional step. In this way, the candidate S-UE selected in the initial decision step is the S-UE of the B-UE.

By using the selection manner 3, an S-UE that has channel quality of both a UU interface link and a UD interface link not lower than channel quality of a UU interface link of a B-UE can be selected, that is, a large gain can be acquired by using the selected S-UE for cooperative communication.

The foregoing several selection manners are only some exemplary implementation manners, and other implementation manners of selecting an S-UE for a B-UE based on the foregoing principle should also fall within the protection scope of the present invention.

Step 505: After determining the S-UEs of the cooperative communication for the B-UE, the base station initiates a multiple UE cooperative communication process, including sending a cooperative communication pairing request to UEs (the B-UE and the S-UEs of the B-UE) participating in the multiple UE cooperative communication. A specific implementation manner is the same as that mentioned above, and details are not described herein again.

Further, in step 505, the cooperative communication pairing request may further carry information such as measurement configuration information of the second-hop link (namely, the UD interface link). The base station instructs the UE to measure channel quality of the second-hop link by sending the measurement configuration information of the second-hop link to the UE, and the channel quality information of the UD interface link is carried when information of the adjacent at least one UE is reported, so that the base station determines the S-UEs for the B-UE with reference to the information.

Figure 7A:
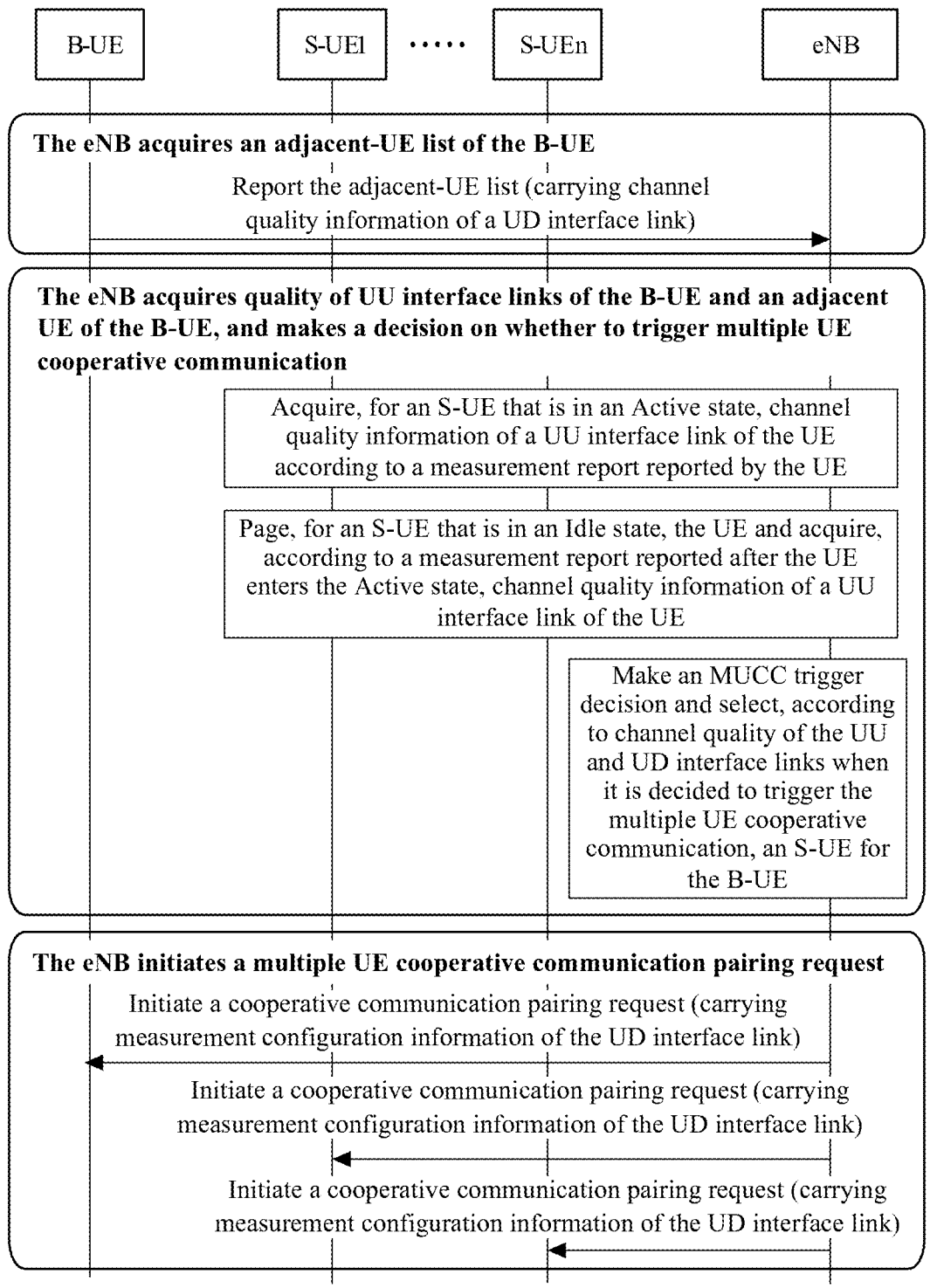
FIG. 7A and FIG. 7B are schematic signaling flowcharts for making a decision on whether to trigger multiple UE cooperative communication according to another embodiment.
Figure 7B:
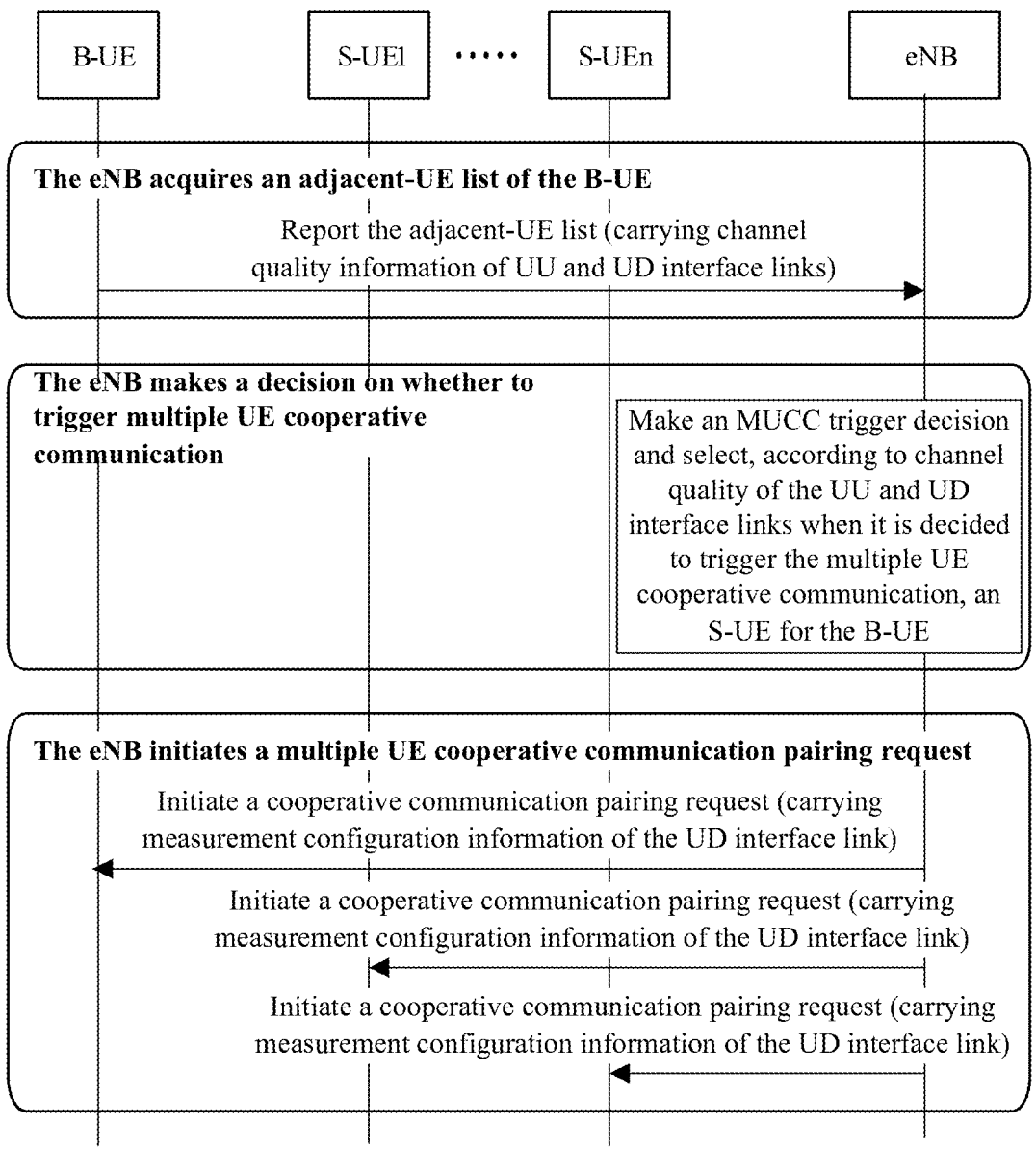

According to the foregoing descriptions, FIG. 7A and FIG. 7B show a signaling interaction process between a UE and an eNB separately.

In the process shown in FIG. 7A, a B-UE reports an adjacent-UE list to an eNB, where the adjacent-UE list includes channel quality information of a UD interface link of an adjacent UE; the eNB acquires, for a UE that is in an Active state in the adjacent-UE list, channel quality of a UU interface link of the UE according to a measurement report reported by the UE, and pages, for a UE that is in an Idle state in the adjacent-UE list, the UE to enable the UE to enter the Active state and acquires, according to a measurement report reported by the UE after the UE enters the Active state, channel quality of a UU interface link of the UE; the eNB makes, according to the acquired channel quality of the UU and UD interface links of the B-UE and the adjacent UE of the B-UE, a decision on whether to trigger multiple UE cooperative communication and initiates a cooperative communication pairing request to the B-UE and an S-UE of the B-UE after it is decided to trigger the multiple UE cooperative communication, where the communication pairing request carries measurement configuration information of the UD interface link.

In the process shown in FIG. 7B, a B-UE reports an adjacent-UE list to an eNB, where the reported adjacent-UE list carries channel quality information of UU and UD interface links of an adjacent UE; the eNB makes, according to acquired channel quality of UU and UD interface links of the B-UE and the adjacent UE of the B-UE, a decision on whether to trigger multiple UE cooperative communication and initiates a cooperative communication pairing request to the B-UE and an S-UE of the B-UE after it is decided to trigger the multiple UE cooperative communication, where the communication pairing request carries measurement configuration information of the UD interface link.

The descriptions of Embodiment 2 show that, based on Embodiment 1, a network device selects a cooperative UE set for a B-UE according to channel quality of both a UU interface link and a UD interface link, which further increases a gain and improves service quality of a UE and overall performance of a network.

It should be noted that the foregoing descriptions are based on an assumption that supplementary information includes channel quality information of a UD interface link. If the supplementary information includes only MUCC capability information of at least one adjacent UE, a base station may first select, from an adjacent UE set of a B-UE, all UEs that support an SUE capability as a candidate S-UE set and then select, from the candidate S-UE set, a candidate UE that has channel quality of a UU interface link not lower than channel quality of a UU interface link of the B-UE as an S-UE of the B-UE. Preferably, one or more (a quantity may be preset) candidate UEs that has the channel quality of the UU interface link higher than the channel quality of the UU interface link of the B-UE may be selected from the candidate S-UE set as the S-UEs of the B-UE based on the channel quality of all the UU interface link in descending order. An S-UE selected in this manner supports an S-UE capability and channel quality of a UU interface link of the S-UE is not lower than the channel quality of the UU interface link of the B-UE.

The base station may acquire, from an adjacent-UE list reported by a UE, MUCC capability information of an adjacent UE, or may also acquire, according to an identifier of an adjacent UE of a B-UE, MUCC capability information of a corresponding UE from a server (for example, a near field service server) that stores UE information.

Embodiment 3

In Embodiment 3, with reference to the schemes for making, by a base station, a decision on whether to trigger multiple UE cooperative communication according to the foregoing embodiments, for application needs of some UEs, a trigger decision may be made by the base station with the aid of a UE.

Specifically, on one hand, the base station makes, in the manners provided by the foregoing embodiments, a decision on whether to trigger multiple UE cooperative communication; on the other hand, the UE also makes a decision on whether to trigger the multiple UE cooperative communication and sends a multiple UE cooperative communication trigger request to the base station when it is decided that the multiple UE cooperative communication needs to be triggered. After receiving the multiple UE cooperative communication trigger request sent by the UE, the base station uses the multiple UE cooperative communication trigger request sent by the UE as supplementary information and further determines, with reference to information such as channel quality of a B-UE and an adjacent UE of the B-UE, whether to trigger the multiple UE cooperative communication. The UE that makes the decision on whether to trigger the multiple UE cooperative communication may be a B-UE, or may also be a UE having an S-UE capability.

If the UE that makes the decision on whether to trigger the multiple UE cooperative communication is the B-UE, the B-UE may make the trigger decision according to a current service rate. Specifically, it is decided that the multiple UE cooperative communication needs to be triggered when the current service rate is less than an expected service rate, with a purpose of improving a service rate of a UE. The service rate may be represented by an AMBR (Aggregated Maximum Bit Rate) or a GBR (Guaranteed Bit Rate) in QoS. The expected service rate may be determined according to factors such as a service need and system performance. The current service rate may be acquired by taking statistics on a UE scheduling rate of the base station. Further, when sending the multiple UE cooperative communication trigger request, the B-UE may send information of candidate S-UEs determined by the B-UE to the base station by carrying the information in the multiple UE cooperative communication trigger request.

If the UE that makes the decision on whether to trigger the multiple UE cooperative communication is the UE having the S-UE capability, the UE is used as a special UE (for example, a super E5, which is mainly used to provide a support service for another UE) and sends, after the B-UE is detected by using a proximity discovery technology, the multiple UE cooperative communication trigger request to the base station when it is discovered that a second-hop link (a UD interface link) with the B-UE reaches an expected gain threshold. Further, when sending the multiple UE cooperative communication trigger request, the UE may send information of candidate S-UEs determined by the UE for the B-UE to the base station by carrying the information in the multiple UE cooperative communication trigger request.

After receiving the multiple UE cooperative communication trigger request sent by the UE, the base station acquires B-UE information carried in the multiple UE cooperative communication trigger request and makes, in the manner in the foregoing embodiment, the decision on whether to trigger the multiple UE cooperative communication for the B-UE. If it is decided that the multiple UE cooperative communication does not need to be triggered for the B-UE, the multiple UE cooperative communication trigger request is discarded and a response may be further returned to the UE initiating the request. If it is decided that the multiple UE cooperative communication needs to be triggered for the B-UE, an S-UE may be further selected for the B-UE in the manner in the foregoing embodiment; or, based on the S-UE selection manner provided by the foregoing embodiment, the candidate S-UEs that the UE carries in the multiple UE cooperative communication trigger request are used as the supplementary information to select an S-UE for the B-UE.

An exemplary manner of implementing that the candidate S-UEs that the UE carries in the multiple UE cooperative communication trigger request are used as the supplementary information to select the S-UE for the B-UE is: the base station determines the S-UE for the B-UE according to the S-UE selection manner provided by the foregoing embodiment, acquires an intersection of the determined S-UE and the candidate S-UEs carried in the multiple UE cooperative communication trigger request, and uses the S-UE acquired by acquiring the intersection as the S-UE of the B-UE. In this way, it is ensured to a certain extent that the B-UE acquires a multiple UE diversity gain.

The descriptions of Embodiment 3 show that, based on Embodiment 1 or Embodiment 2, a UE may also make a decision on whether to trigger MCUU and report a decision result to a network device to assist the network device in making the MUCC trigger decision, thereby further improving service quality of a UE and overall performance of a network.

In conclusion, a network device makes, according to channel quality of a terminal, a decision on whether to trigger multiple UE cooperative communication and selects an S-UE for a B-UE so as to select a proper cooperative set UE for a UE, thereby finally improving service quality of the UE and overall performance (such as spectrum efficiency, throughput, and coverage) of a network.

Based on a same technical idea, the embodiments of the present invention further provide a network device and a terminal device. Principles used by these devices to solve problems are similar to the foregoing processes. Therefore, for implementation of these devices, reference may be made to the implementation of the method, and repeated content is not described herein again.

Figure 8:
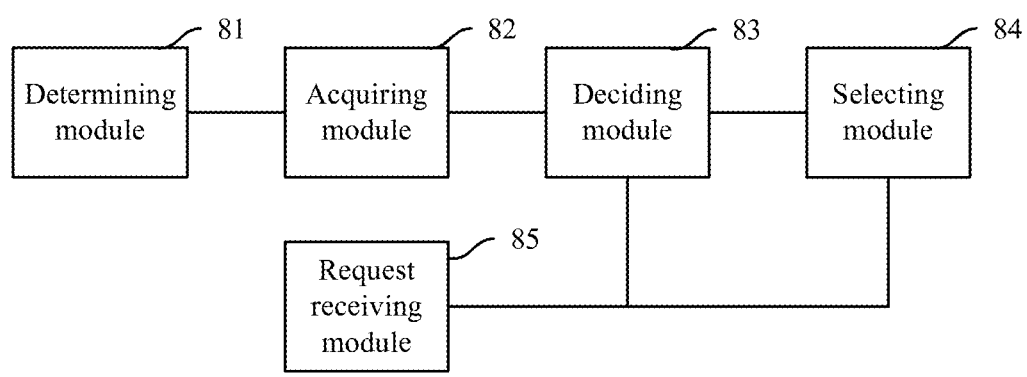
FIG. 8 is a schematic structural diagram of a network device according to an embodiment.

FIG. 8 is a schematic structural diagram of a network device according to an embodiment. The network device may be a base station device or another network access device that is configured to implement functions of a base station. As shown in FIG. 8, the network device may include a determining module 81, an acquiring module 82, a deciding module 83, and a selecting module 84. The following describes main functions of the modules.

The acquiring module 82 is configured to acquire terminal proximity relationship information.

The determining module 81 is configured to determine, according to the proximity relationship information acquired by the acquiring module 82, a beneficed terminal of multiple UE cooperative communication and at least one adjacent terminal of the beneficed terminal, where the proximity relationship information includes at least a D2D code of the at least one adjacent terminal.

The acquiring module 82 is configured to acquire, according to the beneficed terminal and the at least one adjacent terminal of the beneficed terminal that are determined by the determining module 81, channel quality information of the beneficed terminal and the at least one adjacent terminal of the beneficed terminal.

The deciding module 83 is configured to make, according to the channel quality information, which is acquired by the acquiring module 82, of the beneficed terminal and the at least one adjacent terminal of the beneficed terminal, a decision on whether to trigger the multiple UE cooperative communication for the beneficed terminal.

The selecting module 84 is configured to determine a supporting terminal of the multiple UE cooperative communication for the beneficed terminal according to the channel quality information, which is acquired by the acquiring module 82, of the beneficed terminal and the at least one adjacent terminal of the beneficed terminal when the deciding module 83 decides that the multiple UE cooperative communication needs to be triggered.

Specifically, in a first possible implementation manner, the deciding module 83 may decide to trigger the multiple UE cooperative communication for the beneficed terminal if it is determined, according to the channel quality information, which is acquired by the acquiring module 82, of the beneficed terminal and the at least one adjacent terminal of the beneficed terminal, that the at least one adjacent terminal of the beneficed terminal includes a terminal meeting a first condition, where the first condition includes that channel quality of a first link of the at least one adjacent terminal is not lower than channel quality of a first link of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device.

In a second possible implementation manner, the channel quality information acquired by the acquiring module 82 may include: channel quality information of a first link of the beneficed terminal and channel quality information of a first link of the at least one adjacent terminal of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device. Accordingly, the selecting module 84 may select, according to the channel quality information, which is acquired by the acquiring module 82, of the first link of the beneficed terminal and the channel quality information, which is acquired by the acquiring module 82, of the first link of the at least one adjacent terminal of the beneficed terminal, a terminal that has channel quality of the first link not lower than channel quality of the first link of the beneficed terminal from the at least one adjacent terminal of the beneficed terminal, and determine the selected terminal as the supporting terminal of the multiple UE cooperative communication for the beneficed terminal.

With reference to the second possible implementation manner, in a third possible implementation manner, the acquiring module 82 may further acquire multiple UE cooperative communication capability information of the at least one adjacent terminal of the beneficed terminal. Accordingly, the selecting module 84 may select, according to the multiple UE cooperative communication capability information, which is acquired by the acquiring module 82, of the at least one adjacent terminal of the beneficed terminal, a terminal that is capable of supporting the multiple UE cooperative communication and has the channel quality of the first link not lower than the channel quality of the first link of the beneficed terminal from the at least one adjacent terminal of the beneficed terminal, and determine the selected terminal as the supporting terminal of the multiple UE cooperative communication for the beneficed terminal.

In a fourth possible implementation manner, the channel quality information acquired by the acquiring module 82 may include: channel quality information of a first link of the beneficed terminal and channel quality information of first and second links of the at least one adjacent terminal of the beneficed terminal, where the first link of the beneficed terminal is a link between the beneficed terminal and the network device, the first link of the at least one adjacent terminal of the beneficed terminal is a link between the at least one adjacent terminal of the beneficed terminal and the network device, and the second link is a link between the at least one adjacent terminal of the beneficed terminal and the beneficed terminal. Accordingly, the selecting module 84 may select, according to the channel quality information, which is acquired by the acquiring module 82, of the first link of the beneficed terminal and the channel quality information, which is acquired by the acquiring module 82, of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information, which is acquired by the acquiring module 82, of all the second link, a set quantity of candidate supporting terminals from the candidate supporting terminal set based on channel quality of all the second link in descending order, and determine the selected candidate supporting terminals as the supporting terminals of the multiple UE cooperative communication for the beneficed terminal; or the selecting module 84 may select, according to the channel quality information, which is acquired by the acquiring module 82, of the first link of the beneficed terminal and the channel quality information, which is acquired by the acquiring module 82, of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information, which is acquired by the acquiring module 82, of the second link, a candidate supporting terminal that has channel quality of the second link not lower than the channel quality of the first link of the beneficed terminal from the candidate supporting terminal set, and determine the selected candidate supporting terminal as the supporting terminal of the multiple UE cooperative communication for the beneficed terminal.

With reference to the fourth possible implementation manner, in a fifth possible implementation manner, the selecting module 84 may further determine, according to the channel quality information, which is reported by the selected candidate supporting terminal, of the first link after the terminal that has the channel quality of the second link not lower than the channel quality of the first link of the beneficed terminal is selected from the candidate supporting terminal set, whether an expected gain exceeds a set threshold, and determine the selected candidate supporting terminal as the supporting terminal of the multiple UE cooperative communication for the beneficed terminal if the expected gain exceeds the set threshold.

With reference to the fourth possible implementation manner, in a sixth possible implementation manner, the acquiring module 82 may further acquire multiple UE cooperative communication capability information of the at least one adjacent terminal of the beneficed terminal. Accordingly, the selecting module 84 may select, according to the multiple UE cooperative communication capability information, which is acquired by the acquiring module 82, of the at least one adjacent terminal of the beneficed terminal, terminals that are capable of supporting the multiple UE cooperative communication and have the channel quality of the first link not lower than the channel quality of the first link of the beneficed terminal from the at least one adjacent terminal of the beneficed terminal to constitute a candidate supporting terminal set, select a set quantity of candidate supporting terminals from the candidate supporting terminal set based on the channel quality of the second link in descending order, and determine the selected candidate supporting terminals as the supporting terminals of the multiple UE cooperative communication for the beneficed terminal.

With reference to the third or sixth possible implementation manner, in a seventh possible implementation manner, the acquiring module 82 may receive the proximity relationship information reported by a terminal and acquire the multiple UE cooperative communication capability information of the at least one adjacent terminal of the beneficed terminal from the received proximity relationship information.

With reference to the fourth possible implementation manner, in an eighth possible implementation manner, the acquiring module 82 may acquire the channel quality information of the second link of the at least one adjacent terminal of the beneficed terminal in the following manner: receiving the proximity relationship information reported by a terminal and acquiring the channel quality information of the second link of the at least one adjacent terminal of the beneficed terminal from the received proximity relationship information.

With reference to the second or fourth possible implementation manner, in a ninth possible implementation manner, the acquiring module 82 may acquire the channel quality information of the first link of the beneficed terminal and the channel quality information of the first link of the at least one adjacent terminal of the beneficed terminal in the following manner: acquiring, for a terminal that is in an active state in the at least one adjacent terminal of the beneficed terminal, a measurement report reported by the terminal that is in the active state and acquiring, according to the measurement report reported by the terminal that is in the active state, the channel quality information of the first link; and paging, for a terminal that is in an idle state in the at least one adjacent terminal of the beneficed terminal, the terminal that is in the idle state, acquiring a measurement report reported after the terminal that is in the idle state enters the active state, and acquiring, according to the measurement report reported after the terminal that is in the idle state enters the active state, the channel quality information of the first link; or acquiring, according to received information of the at least one adjacent terminal, the channel quality information of the first link of the at least one adjacent terminal of the beneficed terminal, where the information of the at least one adjacent terminal includes the channel quality information of the first link of the at least one adjacent terminal.

In a tenth possible implementation manner, the acquiring module 82 may receive information of the at least one adjacent terminal that is measured by means of proximity discovery and reported by the beneficed terminal of the multiple UE cooperative communication and/or the supporting terminal of the multiple UE cooperative communication; accordingly, the determining module 81 may determine, according to the information, which is received by the acquiring module 82, of the at least one adjacent terminal, the beneficed terminal of the multiple UE cooperative communication and the at least one adjacent terminal of the beneficed terminal. Alternatively, the acquiring module 82 may detect, position information of the beneficed terminal and supporting terminal of the multiple UE cooperative communication; accordingly, the determining module 81 may determine, according to the terminal position information detected by the acquiring module 82, the beneficed terminal of the multiple UE cooperative communication and the at least one adjacent terminal of the beneficed terminal.

With reference to the foregoing implementation manners, in an eleventh possible implementation manner, the network device may further include a request receiving module 85. The request receiving module 85 is configured to: receive a multiple UE cooperative communication trigger request reported by the beneficed terminal and/or the at least one adjacent terminal of the beneficed terminal, where the multiple UE cooperative communication trigger request carries information of the beneficed terminal; and discard the multiple UE cooperative communication trigger request when the deciding module 83 decides that the multiple UE cooperative communication does not need to be triggered for the beneficed terminal corresponding to the information, which is carried in the multiple UE cooperative communication trigger request, of the beneficed terminal.

With reference to the eleventh possible implementation manner, in a twelfth possible implementation manner, the multiple UE cooperative communication trigger request further carries the candidate supporting terminal set of the beneficed terminal corresponding to the information of the beneficed terminal. Accordingly, after the supporting terminal of the multiple UE cooperative communication is determined for the beneficed terminal according to the channel quality information, which is acquired by the acquiring module 82, of the beneficed terminal and the at least one adjacent terminal of the beneficed terminal, the selecting module 84 may acquire an intersection of the supporting terminal of the multiple UE cooperative communication, which is determined for the beneficed terminal according to the channel quality information, which is acquired by the acquiring module 82, of the beneficed terminal and the at least one adjacent terminal of the beneficed terminal, and the candidate supporting terminal set carried in the multiple UE cooperative communication trigger request, and use a terminal acquired by acquiring the intersection as the supporting terminal of the multiple UE cooperative communication for the beneficed terminal.

Figure 9:
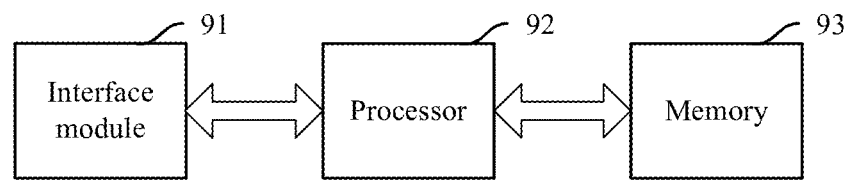
FIG. 9 is a schematic structural diagram of a network device according to another embodiment.

FIG. 9 is a schematic structural diagram of a network device according to another embodiment of the present invention. The network device may be in a form of a hardware structure of the network device shown in FIG. 8. As shown in FIG. 9, the network device may include an interface module 91, a processor 92, and a memory 93.

The processor 92 is configured to: acquire terminal proximity relationship information through the interface module 91, store the terminal proximity relationship information in the memory 93, and determine, according to the proximity relationship information, a beneficed terminal of multiple UE cooperative communication and at least one adjacent terminal of the beneficed terminal, where the proximity relationship information includes at least a device to device D2D code of the at least one adjacent terminal; acquire, according to the determined beneficed terminal and the at least one adjacent terminal of the beneficed terminal, channel quality information of the beneficed terminal and the at least one adjacent terminal of the beneficed terminal and store the channel quality information in the memory 93; and make, according to the acquired channel quality information of the beneficed terminal and the at least one adjacent terminal of the beneficed terminal, a decision on whether to trigger the multiple UE cooperative communication for the beneficed terminal and determine a supporting terminal of the multiple UE cooperative communication for the beneficed terminal according to the channel quality information of the beneficed terminal and the at least one adjacent terminal of the beneficed terminal when it is decided that the multiple UE cooperative communication needs to be triggered.

In a first possible implementation manner, the processor 92 may decide to trigger the multiple UE cooperative communication for the beneficed terminal if it is determined, according to the channel quality information of the beneficed terminal and the at least one adjacent terminal of the beneficed terminal, that the at least one adjacent terminal of the beneficed terminal includes a terminal meeting a first condition, where the first condition includes that channel quality of a first link of the at least one adjacent terminal is not lower than channel quality of a first link of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device.

In a second possible implementation manner, the channel quality information includes: channel quality information of a first link of the beneficed terminal and channel quality information of a first link of the at least one adjacent terminal of the beneficed terminal, where the first link of the beneficed terminal is a link between the beneficed terminal and the network device, and the first link of the at least one adjacent terminal of the beneficed terminal is a link between the at least one adjacent terminal of the beneficed terminal and the network device. Accordingly, the processor 92 may select, according to the channel quality information of the first link of the beneficed terminal and the channel quality information of the first link of the at least one adjacent terminal of the beneficed terminal, a terminal that has channel quality of the first link not lower than channel quality of the first link of the beneficed terminal from the at least one adjacent terminal of the beneficed terminal, and determine the selected terminal as the supporting terminal of the multiple UE cooperative communication for the beneficed terminal.

With reference to the second possible implementation manner, in a third possible implementation manner, the processor 92 may further acquire multiple UE cooperative communication capability information of the at least one adjacent terminal of the beneficed terminal through the interface module 91. Accordingly, the processor 92 may select, according to the multiple UE cooperative communication capability information of the at least one adjacent terminal of the beneficed terminal, a terminal that is capable of supporting the multiple UE cooperative communication and has the channel quality of the first link not lower than the channel quality of the first link of the beneficed terminal from the at least one adjacent terminal of the beneficed terminal, and determine the selected terminal as the supporting terminal of the multiple UE cooperative communication for the beneficed terminal.

In a fourth possible implementation manner, the channel quality information includes: channel quality information of a first link of the beneficed terminal and channel quality information of first and second links of the at least one adjacent terminal of the beneficed terminal, where the first link of the beneficed terminal is a link between the beneficed terminal and the network device, the first link of the at least one adjacent terminal of the beneficed terminal is a link between the at least one adjacent terminal of the beneficed terminal and the network device, and the second link is a link between the at least one adjacent terminal of the beneficed terminal and the beneficed terminal. Accordingly, the processor 92 may select, according to the channel quality information of the first link of the beneficed terminal and the channel quality information of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information of all the second link, a set quantity of candidate supporting terminals from the candidate supporting terminal set based on channel quality of all the second link in descending order, and determine the selected candidate supporting terminals as the supporting terminals of the multiple UE cooperative communication for the beneficed terminal; or the processor 92 may further select, according to the channel quality information of the first link of the beneficed terminal and the channel quality information of the first link of the at least one adjacent terminal of the beneficed terminal, terminals that have channel quality of the first link not lower than channel quality of the first link of the beneficed terminal from the at least one adjacent terminal of the beneficed terminal to constitute a candidate supporting terminal set, select, according to the channel quality information of the second link, a candidate supporting terminal that has channel quality of the second link not lower than the channel quality of the first link of the beneficed terminal from the candidate supporting terminal set, and determine the selected candidate supporting terminal as the supporting terminal of the multiple UE cooperative communication for the beneficed terminal.

With reference to the fourth possible implementation manner, in a fifth possible implementation manner, the processor 92 may further determine, according to the channel quality information, which is reported by the selected candidate supporting terminal, of the first link after the terminal that has the channel quality of the second link not lower than the channel quality of the first link of the beneficed terminal is selected from the candidate supporting terminal set, whether an expected gain exceeds a set threshold, and determine the selected candidate supporting terminal as the supporting terminal of the multiple UE cooperative communication for the beneficed terminal if the expected gain exceeds the set threshold.

With reference to the fourth possible implementation manner, in a sixth possible implementation manner, the processor 92 may further acquire multiple UE cooperative communication capability information of the at least one adjacent terminal of the beneficed terminal through the interface module 91. Accordingly, the processor 92 may select, according to the multiple UE cooperative communication capability information of the at least one adjacent terminal of the beneficed terminal, terminals that are capable of supporting the multiple UE cooperative communication and have the channel quality of the first link not lower than the channel quality of the first link of the beneficed terminal from the at least one adjacent terminal of the beneficed terminal to set a candidate supporting terminal, select a set quantity of candidate supporting terminals from the candidate supporting terminal set based on the channel quality of the second link in descending order, and determine the selected candidate supporting terminals as the supporting terminals of the multiple UE cooperative communication for the beneficed terminal.

With reference to the third or fifth possible implementation manner, in a seventh possible implementation manner, the interface module (91) may receive the proximity relationship information reported by a terminal. Accordingly, the processor 92 may acquire the multiple UE cooperative communication capability information of the at least one adjacent terminal of the beneficed terminal from the proximity relationship information received by the interface module 91.

With reference to the fourth possible implementation manner, in an eighth possible implementation manner, the interface module 91 may receive the proximity relationship information reported by a terminal. Accordingly, the processor 92 may acquire the channel quality information of the second link of the at least one adjacent terminal of the beneficed terminal from the proximity relationship information received by the interface module 91.

With reference to the second or fourth possible implementation manner, in a ninth possible implementation manner, the processor 92 may acquire the channel quality information of the first link of the beneficed terminal and the channel quality information of the first link of the at least one adjacent terminal of the beneficed terminal in the following manner: acquiring, through the interface module 91 for a terminal that is in an active state in the at least one adjacent terminal of the beneficed terminal, a measurement report reported by the terminal that is in the active state and acquiring, according to the measurement report reported by the terminal that is in the active state, the channel quality information of the first link; and paging, through the interface module 91 for a terminal that is in an idle state in the at least one adjacent terminal of the beneficed terminal, the terminal that is in the idle state, acquiring a measurement report reported after the terminal that is in the idle state enters the active state, and acquiring, according to the measurement report reported after the terminal that is in the idle state enters the active state, the channel quality information of the first link; or acquiring, according to information, which is received by the interface module 91, of the at least one adjacent terminal, the channel quality information of the first link of the at least one adjacent terminal of the beneficed terminal, where the information of the at least one adjacent terminal includes the channel quality information of the first link of the at least one adjacent terminal.

In a tenth possible implementation manner, the interface module 91 may receive information of the at least one adjacent terminal that is measured by means of proximity discovery and reported by the beneficed terminal of the multiple UE cooperative communication and/or the supporting terminal of the multiple UE cooperative communication. The processor 92 may determine, according to the information, which is received by the interface module 91, of the at least one adjacent terminal, the beneficed terminal of the multiple UE cooperative communication and the at least one adjacent terminal of the beneficed terminal; or the processor 92 may detect position information of the beneficed terminal and supporting terminal of the multiple UE cooperative communication through the interface module 91 and determine, according to the detected terminal position information, the beneficed terminal of the multiple UE cooperative communication and the at least one adjacent terminal of the beneficed terminal.

With reference to all the possible implementation manners, in an eleventh possible implementation manner, the interface module 91 may further receive a multiple UE cooperative communication trigger request reported by the beneficed terminal and/or the at least one adjacent terminal of the beneficed terminal, where the multiple UE cooperative communication trigger request carries information of the beneficed terminal. Accordingly, the processor 92 discards the multiple UE cooperative communication trigger request if it is decided that the multiple UE cooperative communication does not need to be triggered for the beneficed terminal corresponding to the information, which is carried in the multiple UE cooperative communication trigger request, of the beneficed terminal.

With reference to the eleventh possible implementation manner, in a twelfth possible implementation manner, the multiple UE cooperative communication trigger request further carries the candidate supporting terminal set of the beneficed terminal corresponding to the information of the beneficed terminal. Accordingly, after the supporting terminal of the multiple UE cooperative communication is determined for the beneficed terminal according to the channel quality information of the beneficed terminal and the at least one adjacent terminal of the beneficed terminal, the processor 92 may acquire an intersection of the supporting terminal of the multiple UE cooperative communication, which is determined for the beneficed terminal according to the channel quality information of the beneficed terminal and the at least one adjacent terminal of the beneficed terminal, and the candidate supporting terminal set carried in the multiple UE cooperative communication trigger request, and use a terminal acquired by acquiring the intersection as the supporting terminal of the multiple UE cooperative communication for the beneficed terminal.

Figure 10:
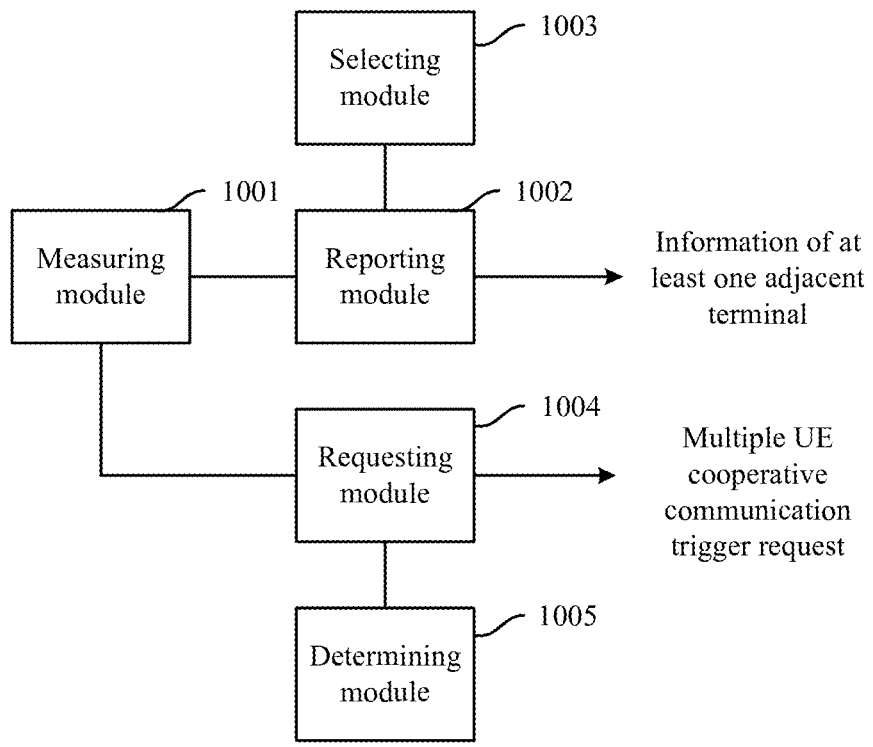
FIG. 10 is a schematic structural diagram of a terminal device according to an embodiment.

FIG. 10 is a schematic structural diagram of a terminal device according to an embodiment of the present invention. The terminal device may be a beneficed terminal of multiple UE cooperative communication or may also be a supporting terminal. As shown in FIG. 10, the terminal device may include a measuring module 1001 and a reporting module 1002. Further, the terminal device may include a selecting module 1003, a requesting module 1004, and a determining module 1005. The following describes main functions of the modules.

The measuring module 1001 is configured to perform measurement to acquire at least one adjacent terminal of the terminal.

The reporting module 1002 is configured to report terminal proximity relationship information measured by the measuring module 1001 to a network device, where the terminal proximity relationship information includes at least a device to device D2D code of the at least one adjacent terminal and information of the at least one adjacent terminal is used for the network device to determine a beneficed terminal of multiple UE cooperative communication and at least one adjacent terminal of the beneficed terminal and make a decision on whether to trigger the multiple UE cooperative communication for the beneficed terminal.

In a first possible implementation manner, the terminal proximity relationship information that the reporting module 1001 reports to the network device further includes one piece of or a combination of the following information: channel quality information of a first link of the at least one adjacent terminal, where the first link is a link between the at least one adjacent terminal and the network device; channel quality information of a second link of the at least one adjacent terminal, where the second link is a link between the at least one adjacent terminal and the terminal reporting the information of the at least one adjacent terminal; and multiple UE cooperative communication capability information of the at least one adjacent terminal.

In a second possible implementation manner, the terminal device further includes the selecting module 1003. The selecting module 1003 is configured to select a to-be-reported adjacent terminal from the terminal proximity relationship information measured by the measuring module 1001. Accordingly, the reporting module 1002 reports information of the adjacent terminal selected by the selecting module 1003 to the network device. The selecting module 1003 may implement one of the following functions: (1) filtering, according to a multiple UE cooperative communication capability of the at least one adjacent terminal of the terminal, the at least one adjacent terminal acquired by the measurement performed by the terminal; (2) selecting, according to channel quality of a first link of the terminal and channel quality of a first link of the at least one adjacent terminal of the terminal, a terminal that has the channel quality of the first link not lower than the channel quality of the first link of the terminal from the at least one adjacent terminal, where the first link is a link between the terminal and the network device; (3) selecting, according to channel quality of a second link of the terminal and channel quality of a second link of the at least one adjacent terminal of the terminal, a set quantity of terminals from the at least one adjacent terminal of the terminal based on the channel quality of the second link in descending order; or selecting a terminal that has channel quality of a second link not lower than a set threshold from the at least one adjacent terminal; and (4) calculating, according to channel quality of first and second links of the at least one adjacent terminal of the terminal, a value of a weighted sum of the channel quality of the first link and the channel quality of the second link, and selecting a set quantity of terminals from the at least one adjacent terminal based on channel quality, which is acquired after weighted summation, in descending order.

With reference to the first or second possible implementation manner, in a third possible implementation manner, the terminal device may further include the requesting module 1004. The requesting module 1004 is configured to: send a multiple UE cooperative communication trigger request to the network device when the terminal is the beneficed terminal of the multiple UE cooperative communication and a current service rate of the terminal is less than an expected service rate; or send a multiple UE cooperative communication trigger request to the network device when the terminal is a supporting terminal of the multiple UE cooperative communication and the terminal determines that a gain of a second link with the beneficed terminal of UE cooperative communication reaches an expected gain threshold.

With reference to the third possible implementation manner, in a fourth possible implementation manner, the terminal device may further include the determining module 1005. The determining module 1005 is configured to determine, a candidate supporting terminal set of the beneficed terminal of the multiple UE cooperative communication before the requesting module 1004 sends the multiple UE cooperative communication trigger request to the network device. Accordingly, the requesting module 1004 may carry the candidate supporting terminal set, which is determined by the determining module 1005, of the beneficed terminal of the multiple UE cooperative communication in the multiple UE cooperative communication trigger request for sending.

Figure 11:
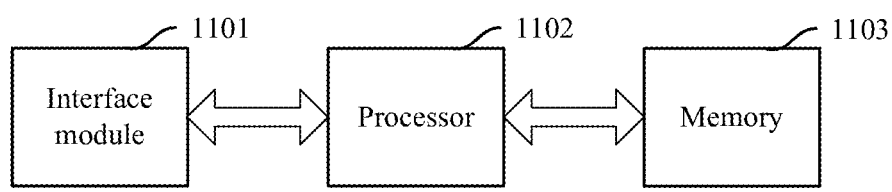
FIG. 11 is a schematic structural diagram of a terminal device according to another embodiment.

FIG. 11 is a schematic structural diagram of a terminal device according to another embodiment of the present invention. The terminal device may be in a form of a hardware structure of the terminal device shown in FIG. 10. As shown in FIG. 11, the terminal device may include an interface module 1101, a processor 1102, and a memory 1103.

The processor 1102 is configured to perform measurement through the interface module 1101 to acquire at least one adjacent terminal of the terminal, save information of the at least one adjacent terminal acquired by the measurement in the memory 1103, and report measured terminal proximity relationship information to a network device through the interface module 1101, where the terminal proximity relationship information includes at least a device to device D2D code of the at least one adjacent terminal and the information of the at least one adjacent terminal is used for the network device to determine a beneficed terminal of multiple UE cooperative communication and at least one adjacent terminal of the beneficed terminal and make a decision on whether to trigger the multiple UE cooperative communication for the beneficed terminal.

In a first possible implementation manner, the terminal proximity relationship information that the processor 1102 reports to the network device through the interface module 1101 further includes one piece of or a combination of the following information: channel quality information of a first link of the at least one adjacent terminal, where the first link is a link between the at least one adjacent terminal and the network device; channel quality information of a second link of the at least one adjacent terminal, where the second link is a link between the at least one adjacent terminal and the terminal reporting the information of the at least one adjacent terminal; and multiple UE cooperative communication capability information of the at least one adjacent terminal.

In a second possible implementation manner, the processor 1102 may select a to-be-reported adjacent terminal from the measured terminal proximity relationship information and report information of the selected adjacent terminal to the network device, where a manner of selecting the to-be-reported adjacent terminal from the measured terminal proximity relationship information includes: filtering, according to a multiple UE cooperative communication capability of the at least one adjacent terminal of the terminal, the at least one adjacent terminal acquired by the measurement performed by the terminal; or selecting, according to channel quality of a first link of the terminal and channel quality of a first link of the at least one adjacent terminal of the terminal, a terminal that has the channel quality of the first link not lower than the channel quality of the first link of the terminal from the at least one adjacent terminal, where the first link is a link between the terminal and the network device; or selecting, according to channel quality of a second link of the terminal and channel quality of a second link of the at least one adjacent terminal of the terminal, a set quantity of terminals from the at least one adjacent terminal of the terminal based on the channel quality of the second link in descending order; or selecting a terminal that has channel quality of a second link not lower than a set threshold from the at least one adjacent terminal; or calculating, according to channel quality of first and second links of the at least one adjacent terminal of the terminal, a value of a weighted sum of the channel quality of the first link and the channel quality of the second link, and selecting a set quantity of terminals from the at least one adjacent terminal based on channel quality, which is acquired after weighted summation, in descending order.

With reference to the terminal device and the first possible implementation manner of the terminal device, in a third possible implementation manner, the processor 1102 may further: send a multiple UE cooperative communication trigger request to the network device through the interface module 1101 when the terminal is the beneficed terminal of the multiple UE cooperative communication and a current service rate of the terminal is less than an expected service rate; or send a multiple UE cooperative communication trigger request to the network device through the interface module 1101 when the terminal is a supporting terminal of the multiple UE cooperative communication and the terminal determines that a gain of a second link with the beneficed terminal of UE cooperative communication reaches an expected gain threshold.

With reference to the third possible implementation manner, in a fourth possible implementation manner, the processor 1102 may further determine, before the multiple UE cooperative communication trigger request is sent to the network device through the interface module 1101, a candidate supporting terminal set of the beneficed terminal of the multiple UE cooperative communication and carry the determined candidate supporting terminal set of the beneficed terminal of the multiple UE cooperative communication in the multiple UE cooperative communication trigger request for sending.

A person skilled in the art should understand that the embodiments may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once learning the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims or their equivalents.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving, by a network device from a first terminal of a plurality of terminals, an adjacent UE list, wherein the adjacent UE list comprises one or more device to device (D2D) codes of one or more second terminals that are adjacent to the first terminal, multiple UE cooperative communication capability information of the one or more second terminals, channel quality information of one or more links between the first terminal and the one or more second terminals, and channel quality information of one or more links between the network device and the one or more second terminals;
   acquiring, by a network device according to the received adjacent UE list, terminal proximity relationship information; and
   determining, according to the proximity relationship information, a beneficed terminal of a multiple UE cooperative communication and one or more adjacent terminals of the beneficed terminal, wherein the proximity relationship information comprises one or more device to device (D2D) codes of the one or more adjacent terminals, and wherein the beneficed terminal is the first terminal or one of the one or more second terminals, and the one or more adjacent terminals comprise one or more terminals of the first terminal and the one or more second terminals that are different from the beneficed terminal;

acquiring, by the network device, channel quality information of the beneficed terminal and the one or more adjacent terminals of the beneficed terminal; and making, by the network device according to the channel quality information of the beneficed terminal and the one or more adjacent terminals of the beneficed terminal, a decision on whether to trigger the multiple UE cooperative communication for the beneficed terminal, and determining a supporting terminal of the multiple UE cooperative communication for the beneficed terminal according to the acquired channel quality information of the beneficed terminal and the one or more adjacent terminals of the beneficed terminal in response to deciding that the multiple UE cooperative communication needs to be triggered.

2. The method according to claim 1, wherein making the decision on whether to trigger the multiple UE cooperative communication for the beneficed terminal comprises:

deciding, by the network device, to trigger the multiple UE cooperative communication for the beneficed terminal in response to determining, according to the channel quality information of the beneficed terminal and the one or more adjacent terminals of the beneficed terminal, that the one or more adjacent terminals of the beneficed terminal comprises a terminal meeting a first condition, wherein the first condition comprises that channel quality of a first link of the terminal is not lower than channel quality of a first link of the beneficed terminal;

wherein the first link of the beneficed terminal is a link between the beneficed terminal and the network device, and the first link of the terminal meeting the first condition is a link between the terminal meeting the first condition and the network device.

3. The method according to claim 1, wherein:

the channel quality information of the beneficed terminal and the one or more adjacent terminals of the beneficed terminal acquired by the network device comprises channel quality information of a first link of the beneficed terminal and channel quality information of one or more first links of the one or more adjacent terminals of the beneficed terminal, wherein the first link of the beneficed terminal is a link between the beneficed terminal and the network device, and the one or more first links of the one or more adjacent terminals of the beneficed terminal are one or more links between the one or more adjacent terminals of the beneficed terminal and the network device; and determining the supporting terminal of the multiple UE cooperative communication for the beneficed terminal comprises selecting, by the network device according to the channel quality information of the first link of the beneficed terminal and the channel quality information of the one or more first links of the one or more adjacent terminals of the beneficed terminal, a terminal of the one or more adjacent terminals of the beneficed terminal that has channel quality of the first link not lower than channel quality of the first link of the beneficed terminal, and determining the selected terminal as the supporting terminal of the multiple UE cooperative communication for the beneficed terminal.

4. The method according to claim 3, further comprising:

acquiring, by the network device, multiple UE cooperative communication capability information of the one or more adjacent terminals of the beneficed terminal;

wherein determining the supporting terminal of the multiple UE cooperative communication for the beneficed terminal comprises:

selecting, by the network device according to the multiple UE cooperative communication capability information of the one or more adjacent terminals of the beneficed terminal, a terminal that is capable of supporting the multiple UE cooperative communication and has the channel quality of the first link not lower than the channel quality of the first link of the beneficed terminal from the one or more adjacent terminals of the beneficed terminal; and determining the selected terminal as the supporting terminal of the multiple UE cooperative communication for the beneficed terminal.

5. The method according to claim 3, wherein the network device acquires the channel quality information of the first link of the beneficed terminal and the channel quality information of the one or more first links of the one or more adjacent terminals of the beneficed terminal in the following manner:

acquiring, by the network device for a terminal that is in an active state in the one or more adjacent terminals of the beneficed terminal, a measurement report reported by the terminal that is in the active state and acquiring, according to the measurement report reported by the terminal that is in the active state, the channel quality information of the first link; and paging, by the network device for a terminal that is in an idle state in the one or more adjacent terminals of the beneficed terminal, the terminal that is in the idle state, acquiring a measurement report reported after the terminal that is in the idle state enters the active state, and acquiring, according to the measurement report reported after the terminal that is in the idle state enters the active state, the channel quality information of the first link; or acquiring, by the network device according to received information of the one or more adjacent terminals, the channel quality information of the one or more first links of the one or more adjacent terminals of the beneficed terminal, wherein the information of the one or more adjacent terminals comprises the channel quality information of the one or more first links of the one or more adjacent terminals.

6. The method according to claim 1, wherein:

the channel quality information of the beneficed terminal and the one or more adjacent terminals of the beneficed terminal acquired by the network device comprises channel quality information of a first link of the beneficed terminal and channel quality information of first and second links of the one or more adjacent terminals of the beneficed terminal, wherein the first link of the beneficed terminal is a link between the beneficed terminal and the network device, the first links of the one or more adjacent terminals of the beneficed terminal is are links between the one or more adjacent terminals of the beneficed terminal and the network device, and the second links are links between the one or more adjacent terminals of the beneficed terminal and the beneficed terminal; and determining the supporting terminal of the multiple UE cooperative communication for the beneficed terminal comprises:

selecting, by the network device according to the channel quality information of the first link of the beneficed terminal and the channel quality information of the first links of the one or more adjacent terminals of the beneficed terminal, one or more terminals of the one or more adjacent terminals of the beneficed terminal that have channel quality of the first links not lower than channel quality of the first link of the beneficed terminal to constitute a candidate supporting terminal set, selecting, according to the channel quality information of the second links, a set quantity of candidate supporting terminals from the candidate supporting terminal set based on channel quality of the second links in descending order, and determining the selected candidate supporting terminals as the supporting terminals of the multiple UE cooperative communication for the beneficed terminal; or selecting, by the network device according to the channel quality information of the first link of the beneficed terminal and the channel quality information of the first links of the one or more adjacent terminals of the beneficed terminal, terminals of the one or more adjacent terminal of the beneficed terminal that have channel quality of the respective first links not lower than channel quality of the first link of the beneficed terminal to constitute a candidate supporting terminal set, selecting a candidate supporting terminal that has channel quality of the respective second link not lower than the channel quality of the first link of the beneficed terminal from the candidate supporting terminal set according to the channel quality information of the respective second link, and determining the selected candidate supporting terminal as the supporting terminal of the multiple UE cooperative communication for the beneficed terminal.

7. The method according to claim 6, wherein after selecting the terminal that has channel quality of the respective second link not lower than the channel quality of the first link of the beneficed terminal from the candidate supporting terminal set, the method further comprises:
determining, by the network device according to the channel quality information, which is reported by the selected candidate supporting terminal, of the first link, whether an expected gain exceeds a set threshold, and determining the selected candidate supporting terminal as the supporting terminal of the multiple UE cooperative communication for the beneficed terminal if the expected gain exceeds the set threshold.

8. A method, comprising:
performing, by a first terminal, measurement to acquire one or more second terminals that are adjacent to the first terminal; and
reporting, by the first terminal, an adjacent UE list to a network device, wherein the adjacent UE list comprises one or more device to device (D2D) codes of the one or more second terminals that are adjacent to the first terminal, multiple UE cooperative communication capability information of the one or more second terminals, channel quality information of one or more links between the first terminal and the one or more second terminals, and channel quality information of one or more links between the network device and the one or more second terminals, so that the network device uses the reported adjacent UE list to determine a beneficed terminal of a multiple UE cooperative communication and one or more adjacent terminals of the beneficed terminal and make a decision on whether to trigger the multiple UE cooperative communication for the beneficed terminal.

9. The method according to claim 8, wherein:
reporting the adjacent UE list to the network device comprises selecting, by the first terminal, one or more to-be-reported adjacent second terminals from the measured second terminals and reporting information of the selected one or more adjacent second terminals to the network device; and
selecting the one or more to-be-reported adjacent second terminals comprises:
filtering, by the first terminal according to a multiple UE cooperative communication capability of the one or more adjacent second terminals of the first terminal, the one or more adjacent second terminals acquired by the measurement performed by the first terminal; or
selecting, by the first terminal according to channel quality of a first link of the first terminal and channel quality of one or more first links of the one or more adjacent second terminals of the first terminal, a second terminal that has the channel quality of the respective first link not lower than the channel quality of the first link of the first terminal from the one or more adjacent second terminals, wherein the first links are links between the respective terminals and the network device; or
selecting, by the first terminal according to channel quality of a second link of the first terminal and channel quality of one or more second links of the one or more adjacent second terminals of the first terminal, a set quantity of second terminals from the one or more adjacent second terminals of the first terminal based on the channel quality of the one or more second links in descending order; or
selecting a second terminal of the one or more adjacent second terminals that has channel quality of a second link that is not lower than a set threshold; or
calculating, by the first terminal according to channel quality of first and second links of respective second terminals of the one or more adjacent second terminals of the first terminal, a value of a weighted sum of the channel quality of the respective first link and the channel quality of the respective second link, and selecting a set quantity of second terminals from the one or more adjacent second terminals based on channel quality, which is acquired after weighted summation, in descending order.

10. A network device, comprising:
a processor, configured to:
acquire an adjacent UE list from a first terminal of a plurality of terminals, wherein the adjacent UE list comprises one or more device to device (D2D) codes of one or more second terminals that are adjacent to the first terminal, multiple UE cooperative communication capability information of the one or more second terminals, channel quality information of one or more links between the first terminal and the one or more second terminals, and channel quality information of one or more links between the network device and the one or more second terminals;
determine, according to the adjacent UE list, a beneficed terminal of multiple UE cooperative communication and one or more adjacent second terminals of the beneficed terminal;
acquire, according to the beneficed terminal and the one or more adjacent second terminals of the beneficed terminal, channel quality information of the beneficed terminal and the one or more adjacent terminals of the beneficed terminal;

make, according to the channel quality information of the beneficed terminal and the adjacent terminals of the beneficed terminal, a decision on whether to trigger the multiple UE cooperative communication for the beneficed terminal; and determine a supporting terminal of the multiple UE cooperative communication for the beneficed terminal according to the channel quality information, of the beneficed terminal and the one or more adjacent terminals of the beneficed terminal when the multiple UE cooperative communication needs to be triggered.

11. The network device according to claim 10, wherein:
the processor is further configured to decide to trigger the multiple UE cooperative communication for the beneficed terminal if it is determined, according to the channel quality information of the beneficed terminal and the one or more adjacent terminals of the beneficed terminal, that the one or more adjacent terminals of the beneficed terminal comprises a terminal meeting a first condition, wherein the first condition comprises that channel quality of a first link of a terminal of the one or more adjacent terminals is not lower than channel quality of a first link of the beneficed terminal; and the first link of the beneficed terminal is a link between the beneficed terminal and the network device, and the first link of the terminal meeting the first condition in the one or more adjacent terminals of the beneficed terminal is a link between the terminal meeting the first condition in the one or more adjacent terminals of the beneficed terminal and the network device.

12. The network device according to claim 10, wherein:
the channel quality information acquired by the processor comprises channel quality information of a first link of the beneficed terminal and channel quality information of one or more first links of the one or more adjacent terminals of the beneficed terminal, wherein the first link of the beneficed terminal is a link between the beneficed terminal and the network device, and the one or more first links of the one or more adjacent terminals of the beneficed terminal is are links between the one or more adjacent terminals of the beneficed terminal and the network device; and the processor is further configured to select, according to the channel quality information of the first link of the beneficed terminal and the channel quality information of the one or more first links of the one or more adjacent terminals of the beneficed terminal, a terminal of the one or more adjacent terminals of the beneficed terminal that has channel quality of the respective first link not lower than channel quality of the first link of the beneficed terminal, and determine the selected terminal as the supporting terminal of the multiple UE cooperative communication for the beneficed terminal.

13. The network device according to claim 12, wherein the processor is further configured to:
acquire multiple UE cooperative communication capability information of the one or more adjacent terminals of the beneficed terminal; and select, according to the multiple UE cooperative communication capability information of the one or more adjacent terminals of the beneficed terminal, a terminal of the one or more adjacent terminals of the beneficed terminal that is capable of supporting the multiple UE cooperative communication and has the channel quality of the first link not lower than the channel quality of the first link of the beneficed terminal, and determine the selected terminal as the supporting terminal of the multiple UE cooperative communication for the beneficed terminal.

14. The network device according to claim 10, wherein:
the channel quality information acquired by the processor comprises channel quality information of a first link of the beneficed terminal and channel quality information of one or more first and second links of the one or more adjacent terminals of the beneficed terminal, wherein the first link of the beneficed terminal is a link between the beneficed terminal and the network device, the one or more first links of the one or more adjacent terminals of the beneficed terminal is are one or more links between the one or more adjacent terminals of the beneficed terminal and the network device, and the one or more second links are links between the one or more adjacent terminals of the beneficed terminal and the beneficed terminal; and the processor is further configured to select, according to the channel quality information of the first link of the beneficed terminal and the channel quality information of the one or more first links of the one or more adjacent terminals of the beneficed terminal, terminals of the one or more adjacent terminals of the beneficed terminal that have channel quality of the respective first link not lower than channel quality of the first link of the beneficed terminal to constitute a candidate supporting terminal set, select, according to the channel quality information of the one or more second links, a set quantity of candidate supporting terminals from the candidate supporting terminal set based on channel quality of the one or more second links in descending order, and determine the selected candidate supporting terminals as the supporting terminals of the multiple UE cooperative communication for the beneficed terminal; or select, according to the channel quality information of the first link of the beneficed terminal and the channel quality information of the one or more first links of the one or more adjacent terminals of the beneficed terminal, terminals of the one or more adjacent terminals of the beneficed terminal that have channel quality of the respective first link not lower than channel quality of the first link of the beneficed terminal to constitute a candidate supporting terminal set, select, according to the channel quality information of the one or more second links, a candidate supporting terminal that has channel quality of the respective second link not lower than the channel quality of the first link of the beneficed terminal from the candidate supporting terminal set, and determine the selected candidate supporting terminal as the supporting terminal of the multiple UE cooperative communication for the beneficed terminal.

15. The network device according to claim 14, wherein the processor is further configured to determine, according to the channel quality information, which is reported by the selected candidate supporting terminal, of the first link after the candidate supporting terminal that has the channel quality of the respective second link not lower than the channel quality of the first link of the beneficed terminal is selected from the candidate supporting terminal set, whether an expected gain exceeds a set threshold, and determine the selected candidate supporting terminal as the supporting terminal of the multiple UE cooperative communication for the beneficed terminal if the expected gain exceeds the set threshold.

16. The network device according to claim 14, wherein the processor is further configured to:
acquire multiple UE cooperative communication capability information of the one or more adjacent terminals of the beneficed terminal; and
elect, according to the multiple UE cooperative communication capability information of the one or more adjacent terminals of the beneficed terminal, terminals of the one or more adjacent terminals of the beneficed terminal that are capable of supporting the multiple UE cooperative communication and have the channel quality of the first links not lower than the channel quality of the first link of the beneficed terminal to constitute the candidate supporting terminal set, select a set quantity of candidate supporting terminals from the candidate supporting terminal set based on the channel quality of the respective second links in descending order, and determine the selected candidate supporting terminals as the supporting terminals of the multiple UE cooperative communication for the beneficed terminal.

17. A first terminal, comprising:
a processor, configured to:
perform measurement to acquire one or more adjacent second terminals of the first terminal; and
report an adjacent UE list to a network device, wherein the adjacent UE list comprises one or more device to device (D2D) codes of the one or more second terminals that are adjacent to the first terminal, multiple UE cooperative communication capability information of the one or more second terminals, channel quality information of one or more links between the first terminal and the one or more second terminals, and channel quality information of one or more links between the network device and the one or more second terminals, and wherein the network device determines whether to trigger multiple UE cooperative communication according to the received adjacent UE list, and determines a beneficed terminal of multiple UE cooperative communication and an adjacent terminal of the beneficed terminal.

18. The first terminal according to claim 17, wherein the processor is further configured to:
select one or more to-be-reported adjacent second terminals from the measured terminals; and
report information of the one or more adjacent second terminals to the network device in the adjacent UE list;
wherein selecting the one or more to-be-reported adjacent second terminals from the measured terminals comprises:
filtering, according to multiple UE cooperative communication capabilities of the one or more adjacent second terminals of the terminal, the one or more adjacent second terminals acquired by the measurement performed by the first terminal; or
selecting, according to channel quality of a first link of the first terminal and channel quality of one or more first links of the one or more adjacent second terminals of the first terminal, a second terminal of the one or more adjacent second terminals of the first terminal that has the channel quality of the respective first link not lower than the channel quality of the first link of the first terminal, wherein the respective first links are links between the respective terminals and the network device; or
selecting, according to channel quality of a second link of the first terminal and channel quality of one or more second links of the one or more adjacent second terminals of the terminal, a set quantity of second terminals from the one or more adjacent second terminals of the first terminal based on the channel quality of the one or more second links in descending order; or
selecting a second terminal of the one or more adjacent second terminals that has a channel quality of a second link that is not lower than a set threshold; or
calculating, according to channel quality of first and second links of respective second terminals of the one or more adjacent second terminals of the first terminal, a value of a weighted sum of the channel quality of the respective first link and the channel quality of the respective second link, and select a set quantity of second terminals from the one or more adjacent second terminals based on channel quality, which is acquired after weighted summation, in descending order.

* * * * *